(12) United States Patent
Mou et al.

(10) Patent No.: US 12,055,306 B2
(45) Date of Patent: Aug. 6, 2024

(54) INDOOR AIR POLLUTION PREVENTION SYSTEM

(71) Applicant: MICROJET TECHNOLOGY CO., LTD., Hsinchu (TW)

(72) Inventors: Hao-Jan Mou, Hsinchu (TW);
Chin-Chuan Wu, Hsinchu (TW);
Ching-Sung Lin, Hsinchu (TW);
Yung-Lung Han, Hsinchu (TW);
Chi-Feng Huang, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 422 days.

(21) Appl. No.: 17/668,455

(22) Filed: Feb. 10, 2022

(65) Prior Publication Data
US 2022/0364748 A1 Nov. 17, 2022

(30) Foreign Application Priority Data

May 14, 2021 (TW) .................................. 110117579

(51) Int. Cl.
*B01D 46/00* (2022.01)
*B01D 46/42* (2006.01)
(Continued)

(52) U.S. Cl.
CPC ...... *F24F 11/0001* (2013.01); *B01D 46/0043* (2013.01); *B01D 46/0049* (2013.01);
(Continued)

(58) Field of Classification Search
CPC ........ B01D 46/00; B01D 46/42; B01D 46/44; B01D 46/46; B01D 53/30; F24F 11/00; F24F 7/08; F24F 8/108
See application file for complete search history.

(56) References Cited

U.S. PATENT DOCUMENTS

2014/0260692 A1   9/2014  Sharp
2018/0250430 A1*  9/2018  Machovina ............ B01D 53/30
(Continued)

FOREIGN PATENT DOCUMENTS

CN    203571895 U    4/2014
CN    105953307 A    9/2016
(Continued)

*Primary Examiner* — Sharon Pregler
(74) *Attorney, Agent, or Firm* — Birch, Stewart, Kolasch & Birch, LLP

(57) ABSTRACT

An indoor pollution prevention system includes a plurality of gas detection modules, one or more intelligent control-driving processing devices, one or more gas-exchange processing devices, one or more intake passages, and one or more discharge passages. The intake passage is connected to the gas-exchange processing device and has an intake opening for guiding the outdoor gas into an indoor space. The discharge passage is connected to the gas-exchange processing device and has a discharge opening for discharging the air pollution source to the outdoor space. The intelligent control-driving processing device controls the gas-exchange processing device to be enabled under a surveillance condition of the gas detection module, so that the air pollution source passes through the discharge passage, filtered and purified by a cleaning and filtration assembly, and is discharged to the outdoor space, thereby allowing the indoor space to have a clean air.

24 Claims, 26 Drawing Sheets

(51) Int. Cl.
  B01D 46/44 (2006.01)
  B01D 46/46 (2006.01)
  B01D 53/30 (2006.01)
  F24F 7/08 (2006.01)
  F24F 8/108 (2021.01)
  F24F 11/00 (2018.01)
  F24F 110/52 (2018.01)

(52) U.S. Cl.
  CPC ....... B01D 46/4272 (2013.01); B01D 46/429 (2013.01); B01D 46/442 (2013.01); B01D 46/46 (2013.01); B01D 53/30 (2013.01); F24F 7/08 (2013.01); F24F 8/108 (2021.01); B01D 2279/35 (2013.01); B01D 2279/45 (2013.01); B01D 2279/50 (2013.01); B01D 2279/55 (2013.01); F24F 2011/0002 (2013.01); F24F 2110/52 (2018.01)

(56) References Cited

U.S. PATENT DOCUMENTS

| | | | |
|---|---|---|---|
| 2019/0078802 A1* | 3/2019 | Xue | F24F 11/30 |
| 2019/0108746 A1 | 4/2019 | Chang et al. | |
| 2021/0063036 A1 | 3/2021 | Oh et al. | |

FOREIGN PATENT DOCUMENTS

| | | | |
|---|---|---|---|
| CN | 206531154 | U | 9/2017 |
| CN | 107297109 | A | 10/2017 |
| CN | 107435963 | A | 12/2017 |
| CN | 110594941 | A | 12/2019 |
| JP | 2002106906 | A | 4/2002 |
| JP | 2005149282 | A | 6/2005 |
| JP | 2008533419 | A | 8/2008 |
| JP | 2011002166 | A | 1/2011 |
| JP | 2015190688 | A | 11/2015 |
| JP | 2016075443 | A | 5/2016 |
| JP | 2016109408 | A | 6/2016 |
| JP | 2017526888 | A | 9/2017 |
| JP | 2018514436 | A | 6/2018 |
| JP | 2019100588 | A | 6/2019 |
| JP | 2019111939 | A | 7/2019 |
| JP | 2019173985 | A | 10/2019 |
| JP | 2019199989 | A | 11/2019 |
| JP | 2020012846 | A | 1/2020 |
| JP | 2020051658 | A | 4/2020 |
| JP | 2020176799 | A | 10/2020 |
| JP | 2021042936 | A | 3/2021 |
| JP | 2021050908 | A | 4/2021 |
| KR | 101841954 | B1 | 3/2018 |
| TW | 202026571 | A | 7/2020 |
| TW | 202115374 | A | 4/2021 |
| WO | 2014185013 | A1 | 11/2014 |
| WO | 2018061147 | A1 | 4/2018 |
| WO | 2018109522 | A1 | 6/2018 |
| WO | 2020053307 | A1 | 3/2020 |
| WO | 2020144247 | A1 | 7/2020 |
| WO | 2021005736 | A | 1/2021 |
| WO | 2021005736 | A1 | 1/2021 |

* cited by examiner

INDOOR AIR POLLUTION PREVENTION SYSTEM

CROSS-REFERENCE TO RELATED APPLICATION

This non-provisional application claims priority under 35 U.S.C. § 119(a) to Patent Application No. 110117579 in Taiwan, R.O.C. on May 14, 2021, the entire contents of which are hereby incorporated by reference.

BACKGROUND

Technical Field

The present disclosure relates to a system which performs gas exchange in the indoor space, in particular, to an indoor air pollution prevention system.

Related Art

In the light of people pay more and more attention to the ambient air quality in daily life by nowadays, it is understood that, gases containing particulate matters (PM1, PM2.5, PM10), carbon dioxide, total volatile organic compounds (TVOC), formaldehyde, etc. or even the particulates, the aerogels, the bacteria, the viruses in the gas might result in adverse effects on the human health, even might be life-threatening when exposure to these gases.

As stated above, it is not easy to control the indoor gas quality since the affecting factors include not only the outdoor space gas quality but also the air conditioning and the pollution source in the indoor space (especially the dusts originated from poor circulation of air in the indoor space). In order to improve the indoor gas quality, air conditioners or air cleaners can be utilized. However, the air conditioner and the air cleaner perform indoor circulation and fail to eliminate most hazardous gases, especially carbon monoxide and carbon dioxide.

Consequently, it is an issue of the present invention to provide a solution that can instantly purify and improve the gas quality of the indoor space, reducing the risks of inhaling hazardous gases and monitoring the gas quality of the indoor space anytime and anywhere.

SUMMARY

In view of the disadvantages, one object of the present disclosure is to provide an indoor air pollution prevention system with a gas-exchange processing device to perform gas exchange of the polluted gas intelligently and selectively, allowing the detection data of the air pollution source in the indoor space can be reduced to a safety detection value, making the air pollution source to become a clean air.

In view of above object, in one embodiment of the present disclosure, an indoor air pollution prevention system adapted to perform gas exchange and filtration for an air pollution source in an indoor space is provided. The system includes a plurality of gas detection modules, at least one intelligent control-driving processing device, at least one gas-exchange processing device, at least one intake passage, and at least one discharge passage. The at least one intake passage is connected to the at least one gas-exchange processing device and comprises an intake opening for guiding the outdoor gas in the outdoor space into the indoor space. The at least one discharge passage is connected to the at least one gas-exchange processing device and comprises a discharge opening for extracting and discharging the air pollution source in the indoor space out to the outdoor space. The at least one intelligent control-driving processing device controls the at least one gas-exchange processing device to be enabled in real-time under a surveillance condition of the gas detection module, therefore the air pollution source in the indoor space passes through a cleaning and filtration assembly in the discharge passage and is discharged to the outdoor space, allowing the air pollution source in the indoor space to be filtered and exchanged to become a clean air.

BRIEF DESCRIPTION OF THE DRAWINGS

The disclosure will become more fully understood from the detailed description given herein below, for illustration only and thus not limitative of the disclosure, wherein.

DETAILED DESCRIPTION

Figure 1A:
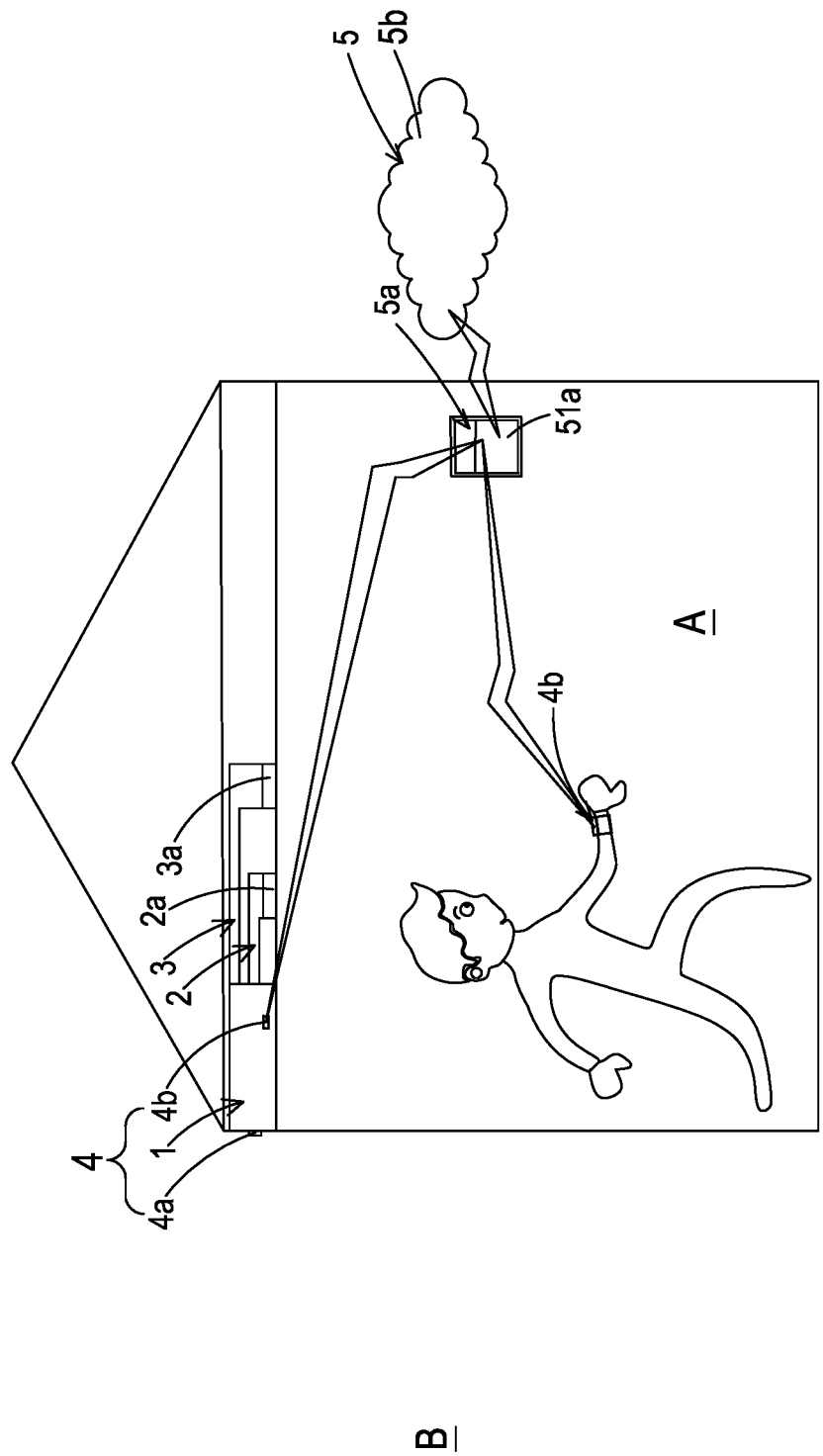
FIG. 1A illustrates a schematic view for the operation of an indoor air pollution prevention system of an exemplary embodiment in the present disclosure, where the system is assembled in the indoor space.
Figure 1B:
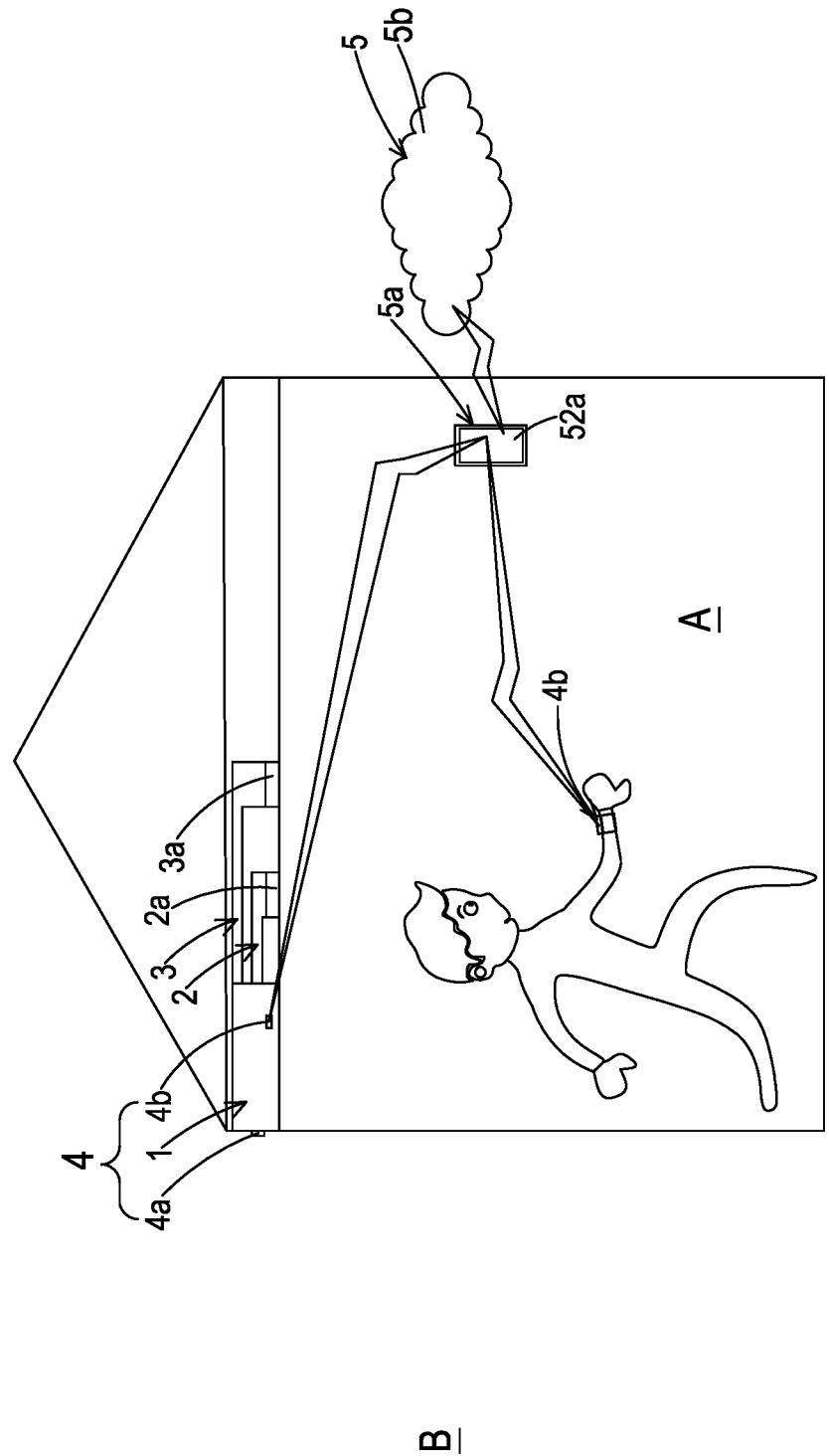
FIG. 1B illustrates a schematic view for the operation of the indoor air pollution prevention system of another exemplary embodiment in the present disclosure, where the system is assembled in the indoor space.

The present disclosure will now be described more specifically with reference to the following embodiments. It is to be noted that the following descriptions of different embodiments of this disclosure are presented herein for purpose of illustration and description only, and it is not intended to limit the scope of the present disclosure.

Please refer to FIG. 1A to 1F, according to one or some embodiments of the present disclosure, an indoor air pollution prevention system is provided and is adapted to perform gas exchange and filtration for an indoor space A. The system includes a gas-exchange processing device 1, a central air conditioning system formed by at least one intake passage 2 and at least one discharge passage 3, at least one cleaning and filtration assembly D, at least one gas detection module 4, and at least one intelligent control-driving processing device 5, wherein the intake passage 2 further includes an intake opening 2a, and the discharge passage 3 further includes a discharge opening 3a. The gas detection modules 4 are disposed at two sides of the cleaning and filtration assembly D for detecting the air pollution source and transmitting a gas detection data. The gas detection modules 4 include at least one outdoor gas detection module 4a and at least one indoor gas detection module 4b. The outdoor gas detection module 4a detects an outdoor gas in an outdoor space B and transmits an outdoor gas detection data, also the indoor gas detection module 4b detects an air pollution source in the indoor space A and transmits an indoor gas detection data.

The gas-exchange processing device 1 is adapted to control the outdoor gas in the outdoor space B to be introduced into the indoor space A or not for filtering and performing gas exchange to the air pollution source in the indoor space A. As shown in FIG. 1F, the gas-exchange processing device 1 includes an intake channel 11a, a discharge channel 12a, and a circulation channel 13a. The intake channel 11a comprises at least one intake entrance 111a and at least one intake exit 112a. The discharge channel 12a comprises at least one discharge entrance 121a and at least one discharge exit 122a. The intake exit 112a of the intake channel 11a is connected with the intake passage 2 (as shown in FIG. 1D and FIG. 1F), and the discharge entrance 121a of the discharge channel 12a is connected with the discharge passage 3 (as shown in FIG. 1E and FIG. 1F). The outdoor gas detection module 4a is disposed at the intake entrance 111a of the intake channel 11a, and the indoor gas detection module 4b is disposed at the intake exit 112a of the intake channel 11a.

Furthermore, in one preferred embodiment of the present invention, the gas-exchange processing device 1 further includes at least one flow-guiding component C and at least one cleaning and filtration assembly D. The flow-guiding component C and the cleaning and filtration assembly D are disposed in the intake channel 11a, and the indoor gas detection module 4b enables the operation of the flow-guiding component C of the gas-exchange processing device 1.

In one embodiment of the present invention, the flow-guiding component C includes an intake flow-guiding component C1 and a discharge flow-guiding component C2. The cleaning and filtration assembly D and the intake flow-guiding component C1 are disposed in the intake channel 11a, and the intake flow-guiding component C1 guides the outdoor gas in the outdoor space B into the cleaning and filtration assembly D through the intake channel 11a, then the outdoor gas is introduced into the indoor space A through the intake passage 2. The discharge flow-guiding component C2 is disposed in the discharge channel 12a to extract the air pollution source of the indoor space A in the discharge passage 3 and discharge the air pollution source to the outdoor space B through the discharge channel 12a. The circulation channel 13a is in connection between the intake channel 11a and the discharge channel 12a. Therefore, the air pollution source of the indoor space A in the discharge passage 3 is introduced into the circulation channel 13a, passing through the intake channel 11a, and guided by the intake flow-guiding component C1 to pass through the at least one cleaning and filtration assembly D to be introduced into the indoor space A again through the intake passage 2, achieving a circulating filtration for the air pollution source in the indoor space A.

Moreover, in some embodiments, an intake valve 14 is disposed at the intake entrance 111a of the intake channel 11a, and a discharge valve 15 is disposed at the discharge exit 122a of the discharge channel 12a. Therefore, the intelligent control-driving processing device 5 may receive the indoor gas detection data detected by the indoor gas detection module 4a and the outdoor gas detection data detected by the outdoor gas detection module 4b through a wireless transmission. When the intelligent control-driving processing device 5 makes an identification that the indoor gas detection data is higher than the outdoor gas detection data, the intelligent control-driving processing device 5 selectively transmits the driving command to the outdoor gas detection module 4b, enabling the operations of the intake flow-guiding component C1 and the discharge flow-guiding component C2 of the gas-exchange processing device 1 to control the intake valve 14 and the discharge valve 15 to be opened, thereby the outdoor gas in the outdoor space B is guided by the intake flow-guiding component C1 from the intake entrance 111a, passes through the cleaning and filtration assembly D in the intake channel 11a to be filtered and purified, and introduced into the indoor space A through the intake passage 2, then the air pollution source of the indoor space A in the discharge passage 3 is extracted by the discharge flow-guiding component C2 and discharged to the outdoor space B by the discharge exit 122a through the discharge channel 12a, allowing the indoor space A to have the clean air under the surveillance condition of the indoor gas detection module 4b.

Alternatively, when the intelligent control-driving processing device 5 makes an identification that the indoor gas detection data is lower than the outdoor gas detection data, the intelligent control-driving processing device 5 transmits the driving command to the indoor gas detection module 4b, enabling the operations of the intake flow-guiding component C1 and the discharge flow-guiding component C2 of the gas-exchange processing device 1 to control the intake valve 14 to be closed and the discharge valve 15 to be opened, therefore the air pollution source of the indoor space A in the discharge passage 3 is extracted by the discharge flow-guiding component C2 and discharged to the outdoor space B by the discharge exit 122a through the discharge channel 12a. Furthermore, the air pollution source of the indoor space A passes through the circulation channel 13a and the intake channel 11a, filtered and purified by the cleaning and filtration assembly D, then the air pollution source is introduced to the indoor space A through the intake passage 2, allowing the indoor space to have the clean air under the surveillance condition of the indoor gas detection module 4b.

Figure 1C:
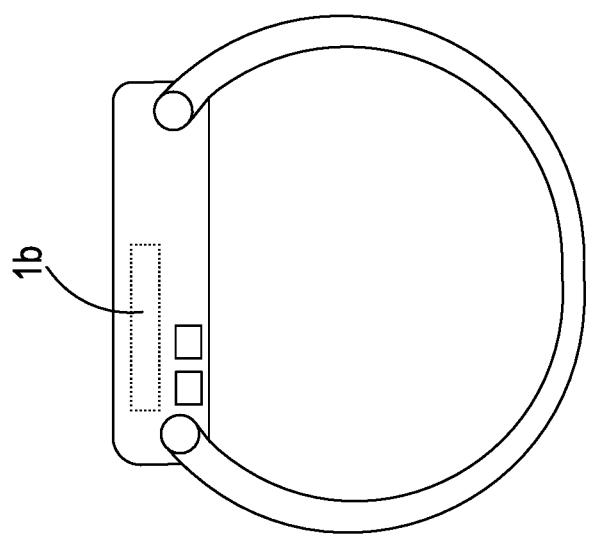
FIG. 1C illustrates a schematic view for the operation of an indoor gas detection module of the exemplary embodiment in the present disclosure.
Figure 1D:
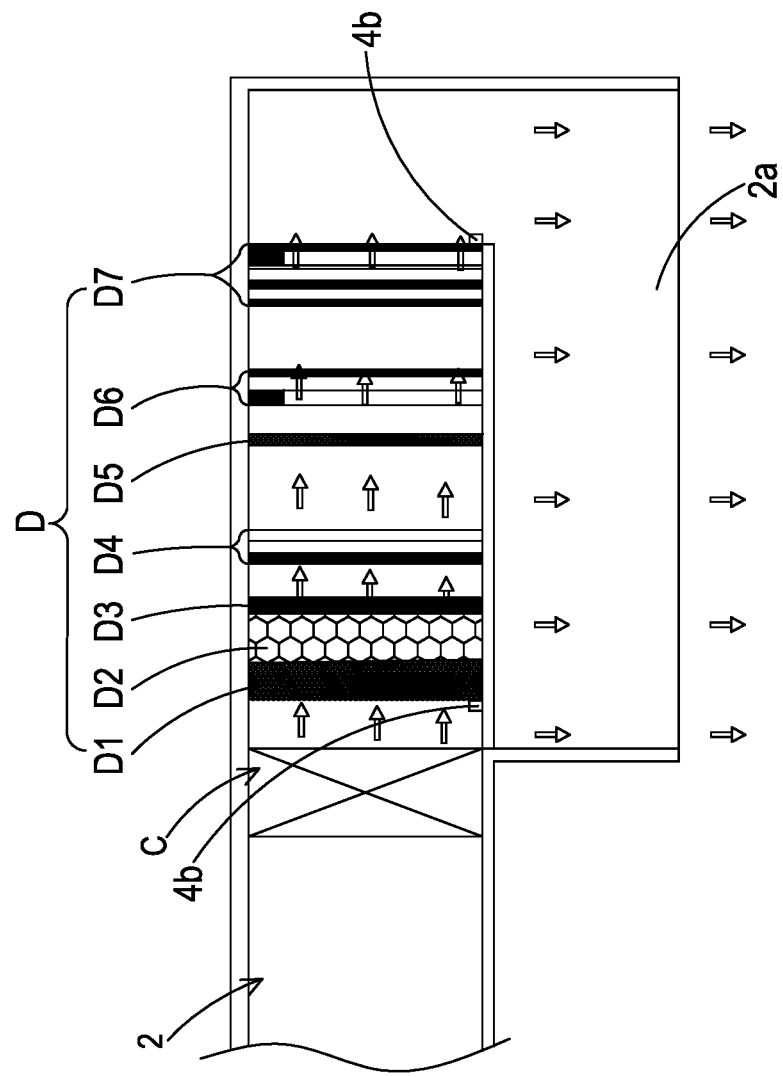
FIG. 1D illustrates a schematic cross-sectional view for the operation of a cleaning and filtration assembly of the exemplary embodiment in the present disclosure.
Figure 1E:
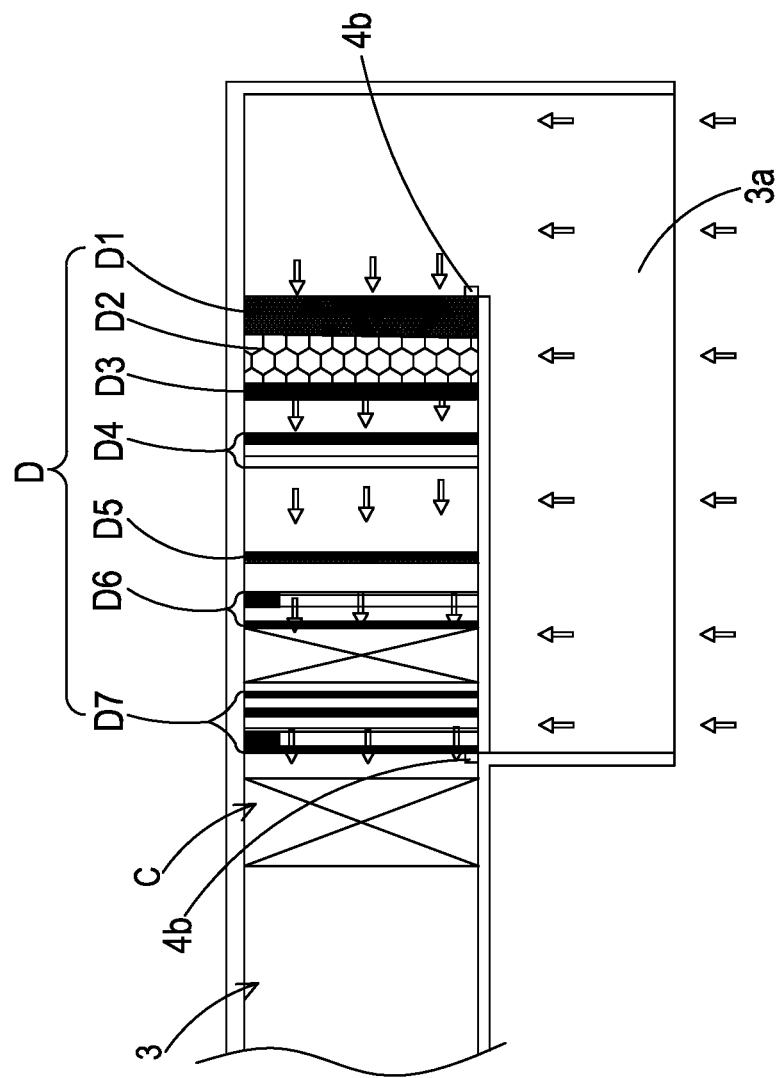
FIG. 1E illustrates another schematic cross-sectional view for the operation of the cleaning and filtration assembly of the exemplary embodiment in the present disclosure.
Figure 1F:
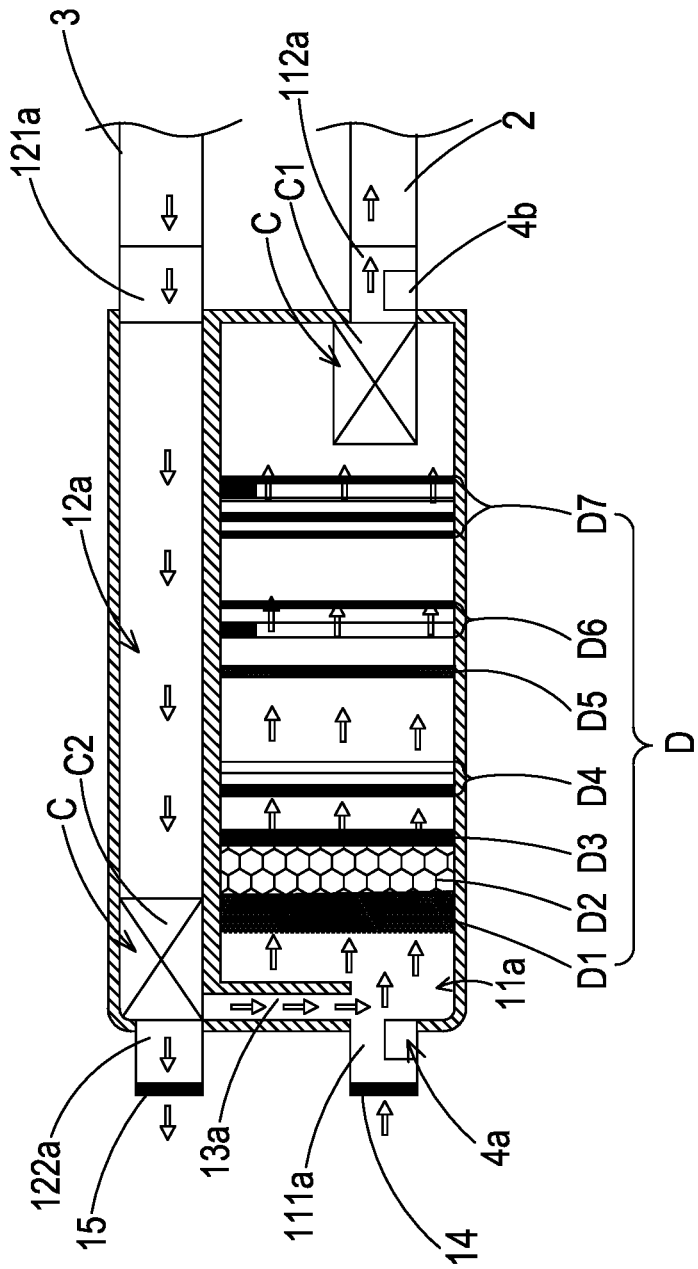
FIG. 1F illustrates a cross-sectional view of the gas-exchange processing device of the exemplary embodiment in the present disclosure.

Please refer to FIG. 1A and FIG. 1C. The intelligent control-driving processing device 5 includes a receiving driver 5a and a cloud processing device 5b. The receiving driver 5a receives the gas detection data outputted by the gas detection modules 4 and transmits said gas detection data to the cloud processing device 5b. The cloud processing device 5b performs intelligent computation and comparison to generate a comparison result, and the cloud processing device 5b intelligently and selectively transmits the driving command to the receiving driver 5a according to the comparison result, so that the intelligent control-driving processing device 5 enables the operation of the gas-exchange processing device 1 and at least one indoor cleaning and filtration device 6 through the receiving driver 5a. In one embodiment of the present disclosure, the receiving driver 5a may be a movable driver 51a, a mobile device 52a, or a wearable device. The movable device 51a has a monitor to display the indoor gas detection data. The mobile device 52a is a smart phone and can display the indoor gas detection data. The wearable device may be assembled with the indoor gas detection module 4b and is capable of being worn on a human to detect the air pollution source in the indoor space A in real-time and transmit the indoor gas detection data to the at least one intelligent control-driving processing device 5.

Moreover, in one embodiment of the present invention, the indoor cleaning and filtration device 6 includes a flow-guiding component C, a cleaning and filtration assembly D, and a monitor. The monitor is adapted to display the indoor gas detection data. The indoor cleaning and filtration device 6 receives the driving command transmitted by the intelligent control-driving processing device 5 to filter the air pollution source in the indoor space A. Please refer to FIG. 2C, at least one indoor gas detection module 4b is disposed in an intake path of the indoor cleaning and filtration device 6, and at least one indoor gas detection module 4b is disposed in a discharge path of the indoor cleaning and filtration device 6, allowing the intelligent control-driving processing device 5 to receive and compare the gas detection data outputted by the indoor gas detection module 4b of the indoor space A. Further, the intelligent control-driving processing device 5 controls the indoor cleaning and filtration device 6 enabled in real-time under a surveillance condition, therefore the air pollution source in the indoor space A passes through the indoor cleaning and filtration device 6, allowing the air pollution source in the indoor space A to be filtered and exchanged to become a clean air. In one aspect of the present disclosure, the surveillance condition is defined as the gas detection data of the air pollution source in the indoor space A detected by the gas detection modules 4 exceeds a safety detection value, wherein the safety detection value includes at least one selected from the group consisting of a concentration of PM2.5 which is less than 35 $\mu g/m^3$, a concentration of carbon dioxide which is less than 1000 ppm, a concentration of total volatile organic compounds which is less than 0.56 ppm, a concentration of formaldehyde which is less than 0.08 ppm, a colony-forming unit per cubic meter of bacteria which is less than 1500 $CFU/m^3$, a colony-forming unit per cubic meter of fungi which is less than 1000 $CFU/m^3$, a concentration of sulfur dioxide which is less than 0.075 ppm, a concentration of nitrogen dioxide which is less than 0.1 ppm, a concentration of carbon monoxide which is less than 9 ppm, a concentration of ozone which is less than 0.06 ppm, and a concentration of lead which is less than 0.15 $\mu g/m^3$.

Moreover, in some embodiments, the intelligent control-driving processing device 5 receives and compares the indoor gas detection data detected by at least three of the indoor gas detection modules 4b to perform intelligent computation to figure out a location of the indoor space A containing the air pollution source, accordingly, the intelligent control-driving processing device 5 intelligently and selectively enables the operation of a gas-exchange processing device 1 or an indoor cleaning and filtration device 6 nearby the air pollution source. Therefore, the air pollution source can be purified to become a clean air and the spreading of the air pollution source can be prevented. Alternatively, in some other embodiments, the intelligent control-driving processing device 5 receives and compares the indoor gas detection data detected by at least three of the indoor gas detection modules 1b to perform intelligent computation to figure out a location of the indoor space A containing the air pollution source, and the intelligent control-driving processing device 5 intelligently and selectively enables the operation of a gas-exchange processing device 1 or an indoor cleaning and filtration device 6 nearby the air pollution source in a first priority, accordingly, the intelligent control-driving processing device 5 performs intelligent computation to enable rest of the indoor cleaning and filtration devices 6 intelligently and selectively, resulting in forming a flow for guiding the air pollution source in the indoor space A toward the indoor cleaning and filtration device 6 nearby the air pollution source for being filtered quickly.

Figure 2A:
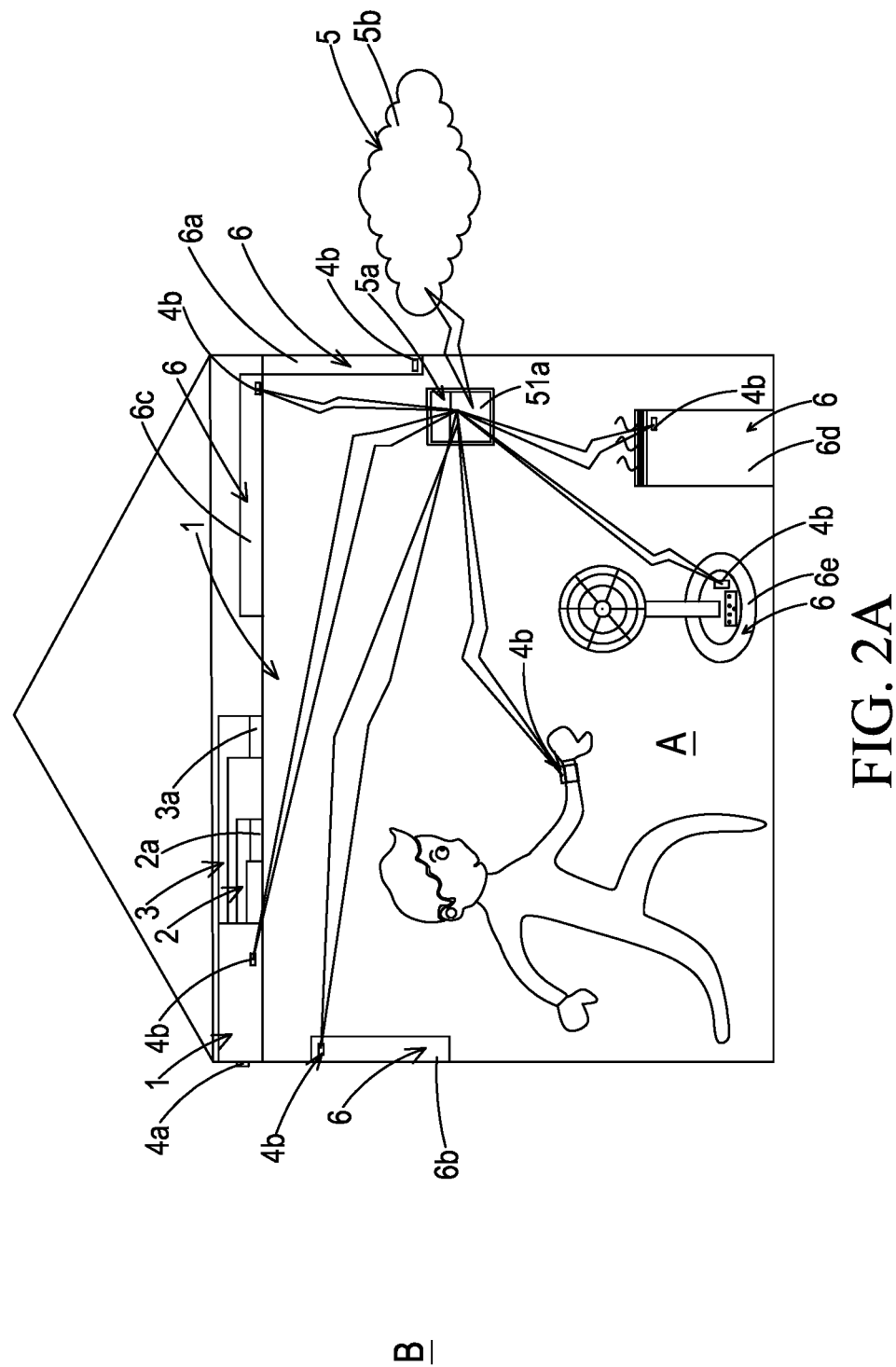
FIG. 2A illustrates a schematic view for the operation of an indoor cleaning and filtration device of the exemplary embodiment in the present disclosure.
Figure 2B:
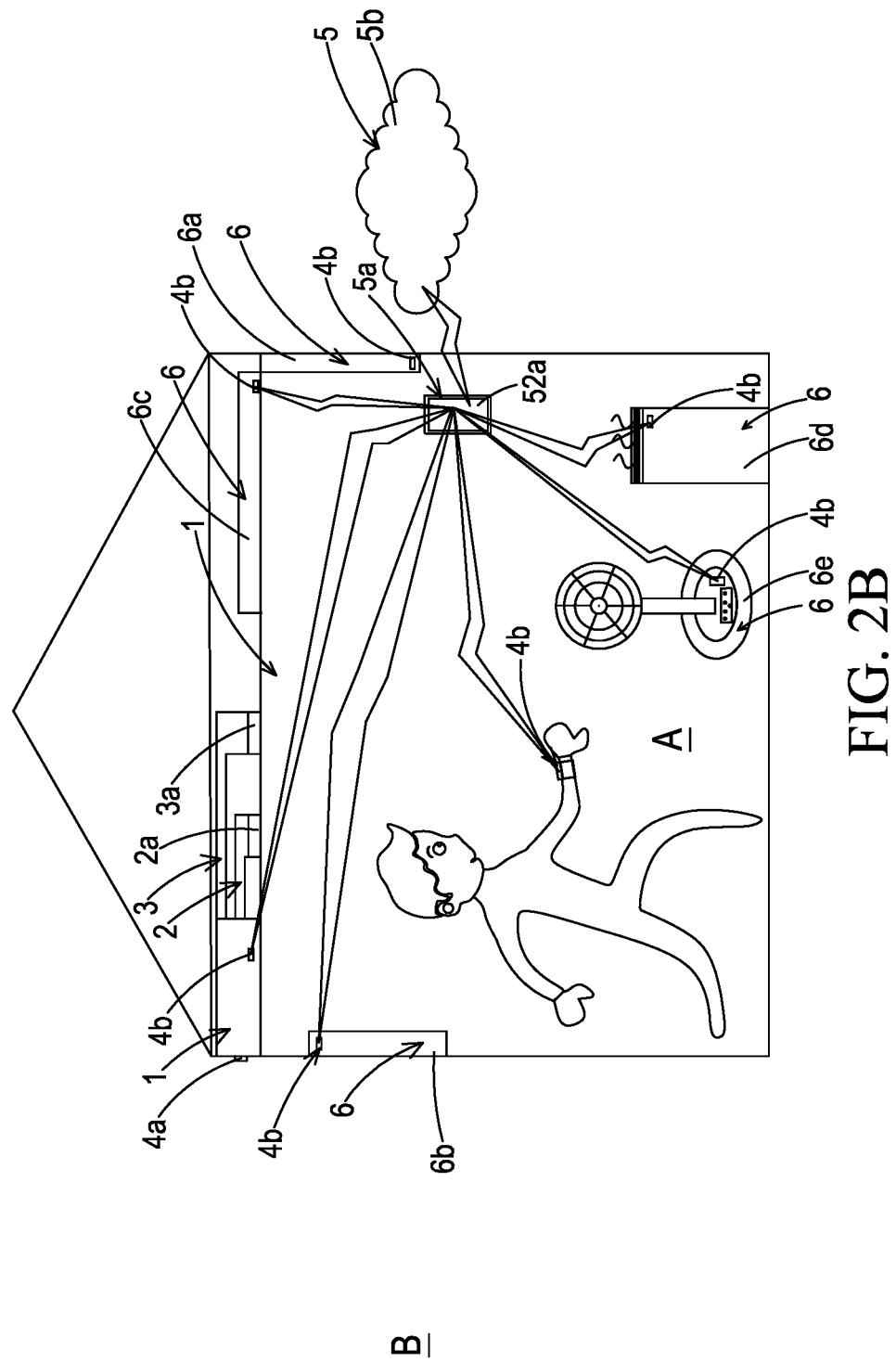
FIG. 2B illustrates another schematic view for the operation of the indoor cleaning and filtration device of the exemplary embodiment in the present disclosure.

Please refer to FIG. 2A and FIG. 2B. In one embodiment of the present invention, the indoor cleaning and filtration device 6 is an air conditioner 6a, the indoor gas detection module 4b is assembled on the indoor cleaning and filtration device 6 for enabling the operation of the indoor cleaning and filtration device 6, wherein the cleaning and filtration assembly D of the indoor cleaning and filtration device 6 is disposed in front of the flow-guiding component C of the indoor cleaning and filtration device 6. Moreover, the intelligent control-driving processing device 2 receives and compares the outdoor gas detection data and the indoor gas detection data, performing an intelligent selection and transmitting the driving command to the indoor gas detection module 4b for enabling the operation of the indoor cleaning and filtration device 6, making the flow-guiding component C of the indoor cleaning and filtration device 6 guide the air pollution source in the indoor space A to pass through the cleaning and filtration assembly D of the indoor cleaning and filtration device 6 for filtration, and allowing the air pollution source in the indoor space A to be filtered to form the clean air.

In one embodiment of the present invention, the indoor cleaning and filtration device 6 is a cooker hood 6b, the indoor gas detection module 4b is assembled on the indoor cleaning and filtration device 6 for enabling the operation of the indoor cleaning and filtration device 6, wherein the cleaning and filtration assembly D of the indoor cleaning and filtration device 6 is disposed in front of the flow-guiding component C of the indoor cleaning and filtration device 6. Moreover, the intelligent control-driving processing device 2 receives and compares the outdoor gas detection data and the indoor gas detection data, performing an intelligent selection and transmitting the driving command to the indoor gas detection module 4b for enabling the operation of the indoor cleaning and filtration device 6, making the flow-guiding component C of the indoor cleaning and filtration device 6 guide the air pollution source in the indoor space A to pass through the cleaning and filtration assembly D of the indoor cleaning and filtration device 6 for filtration, and allowing the air pollution source in the indoor space A to be filtered to form the clean air.

In one embodiment of the present invention, the indoor cleaning and filtration device 6 is a ventilator 6c, the indoor gas detection module 4b is assembled on the indoor cleaning and filtration device 6 for enabling the operation of the indoor cleaning and filtration device 6, wherein the cleaning and filtration assembly D of the indoor cleaning and filtration device 6 is disposed in front of the flow-guiding component C of the indoor cleaning and filtration device 6. Moreover, the intelligent control-driving processing device 2 receives and compares the outdoor gas detection data and the indoor gas detection data, performing an intelligent selection and transmitting the driving command to the indoor gas detection module 4b for enabling the operation of the indoor cleaning and filtration device 6, making the flow-guiding component C of the indoor cleaning and filtration device 6 guide the air pollution source in the indoor space A to pass through the cleaning and filtration assembly D of the indoor cleaning and filtration device 6 for filtration, and allowing the air pollution source in the indoor space A to be filtered to form the clean air.

In one embodiment of the present invention, the indoor cleaning and filtration device 6 is a cleaner 6d, the indoor gas detection module 4b is assembled on the indoor cleaning and filtration device 6 for enabling the operation of the indoor cleaning and filtration device 6, wherein the cleaning and filtration assembly D of the indoor cleaning and filtration device 6 is disposed in front of the flow-guiding component C of the indoor cleaning and filtration device 6. Moreover, the intelligent control-driving processing device 2 receives and compares the outdoor gas detection data and the indoor gas detection data, performing an intelligent selection and transmitting the driving command to the indoor gas detection module 4b for enabling the operation of the indoor cleaning and filtration device 6, making the flow-guiding component C of the indoor cleaning and filtration device 6 guide the air pollution source in the indoor space A to pass through the cleaning and filtration assembly D of the indoor cleaning and filtration device 6 for filtration, and allowing the air pollution source in the indoor space A to be filtered to form the clean air.

In one embodiment of the present invention, the indoor cleaning and filtration device 6 is an electric fan 6e, the indoor gas detection module 4b is assembled on the indoor cleaning and filtration device 6 for enabling the operation of the indoor cleaning and filtration device 6, wherein the cleaning and filtration assembly D of the indoor cleaning and filtration device 6 is disposed in front of the flow-guiding component C of the indoor cleaning and filtration device 6. Moreover, the intelligent control-driving processing device 2 receives and compares the outdoor gas detection data and the indoor gas detection data, performing an intelligent selection and transmitting the driving command to the indoor gas detection module 4b for enabling the operation of the indoor cleaning and filtration device 6, making the flow-guiding component C of the indoor cleaning and filtration device 6 guide the air pollution source in the indoor space A to pass through the cleaning and filtration assembly D of the indoor cleaning and filtration device 6 for filtration, and allowing the air pollution source in the indoor space A to be filtered to form the clean air.

In one embodiment of the present invention, the indoor cleaning and filtration device 6 is a vacuum cleaner, the indoor gas detection module 4b is assembled on the indoor cleaning and filtration device 6 for enabling the operation of the indoor cleaning and filtration device 6, wherein the cleaning and filtration assembly D of the indoor cleaning and filtration device 6 is disposed in front of the flow-guiding component C of the indoor cleaning and filtration device 6. Moreover, the intelligent control-driving processing device 2 receives and compares the outdoor gas detection data and the indoor gas detection data, performing an intelligent selection and transmitting the driving command to the indoor gas detection module 4b for enabling the operation of the indoor cleaning and filtration device 6, making the flow-guiding component C of the indoor cleaning and filtration device 6 guide the air pollution source in the indoor space A to pass through the cleaning and filtration assembly D of the indoor cleaning and filtration device 6 for filtration, and allowing the air pollution source in the indoor space A to be filtered to form the clean air.

In one embodiment of the present invention, the indoor cleaning and filtration device 6 is a blower fan, the indoor gas detection module 4b is assembled on the indoor cleaning and filtration device 6 for enabling the operation of the indoor cleaning and filtration device 6, wherein the cleaning and filtration assembly D of the indoor cleaning and filtration device 6 is disposed in front of the flow-guiding component C of the indoor cleaning and filtration device 6. Moreover, the intelligent control-driving processing device 2 receives and compares the outdoor gas detection data and the indoor gas detection data, performing an intelligent selection and transmitting the driving command to the indoor gas detection module 4b for enabling the operation of the indoor cleaning and filtration device 6, making the flow-guiding component C of the indoor cleaning and filtration device 6 guide the air pollution source in the indoor space A to pass through the cleaning and filtration assembly D of the indoor cleaning and filtration device 6 for filtration, and allowing the air pollution source in the indoor space A to be filtered to form the clean air.

Figure 2C:
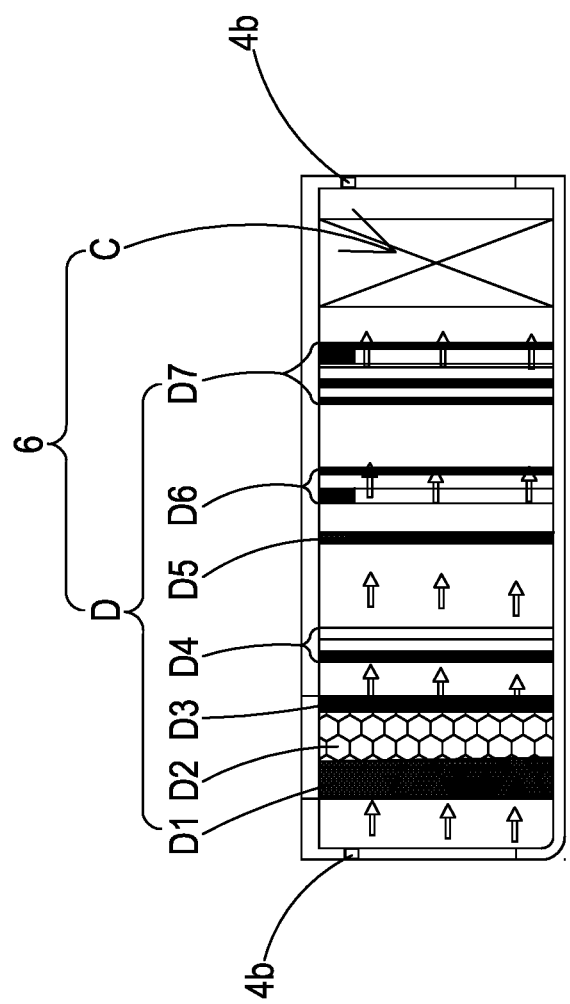
FIG. 2C illustrates a cross-sectional view of the cleaning and filtration assembly of the exemplary embodiment in the present disclosure.
Figure 3:
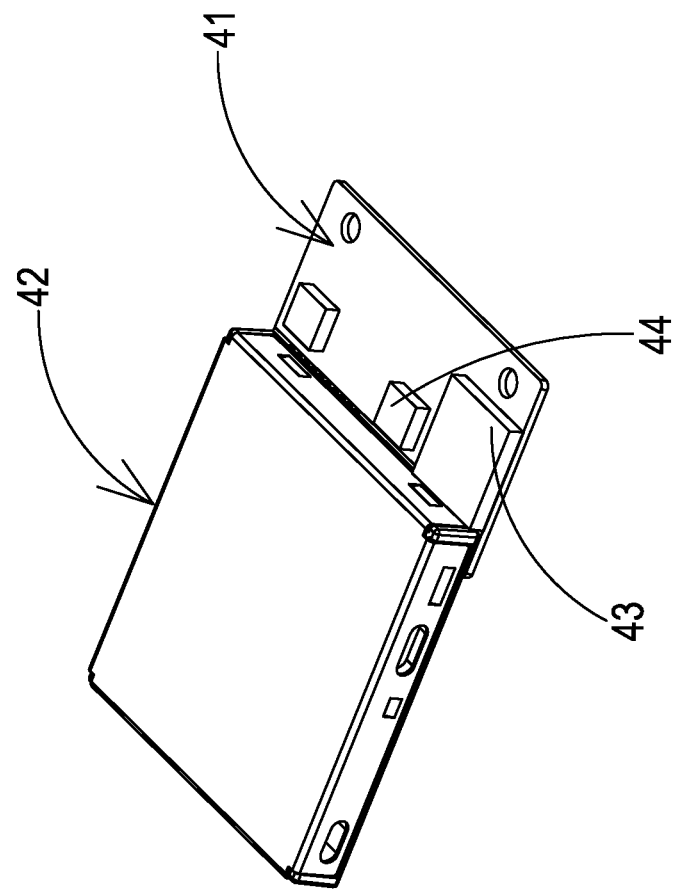
FIG. 3 illustrates a schematic perspective view of a gas detection module of the exemplary embodiment in the present disclosure.
Figure 4A:
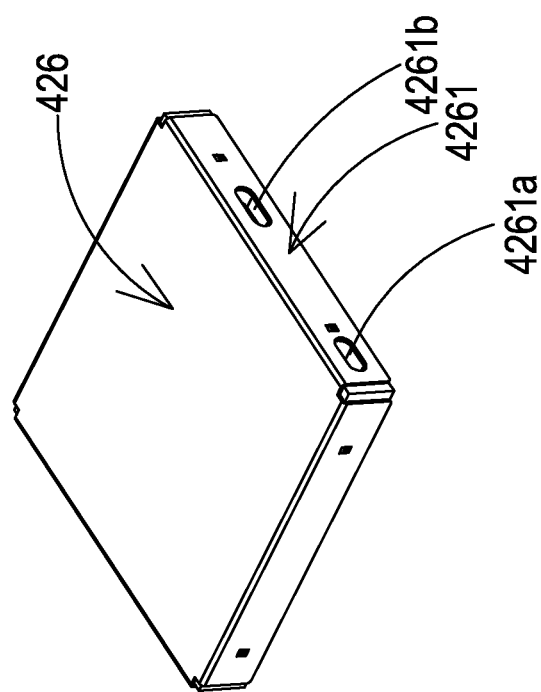
FIG. 4A illustrates a schematic perspective view of a gas detection main body of the exemplary embodiment in the present disclosure.
Figure 4B:
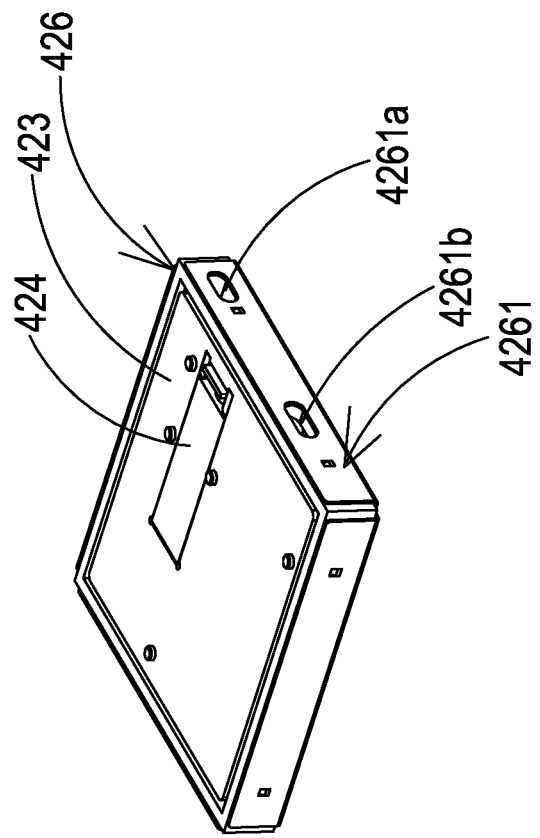
FIG. 4B illustrates another schematic perspective view of the gas detection main body of the exemplary embodiment in the present disclosure.
Figure 4C:
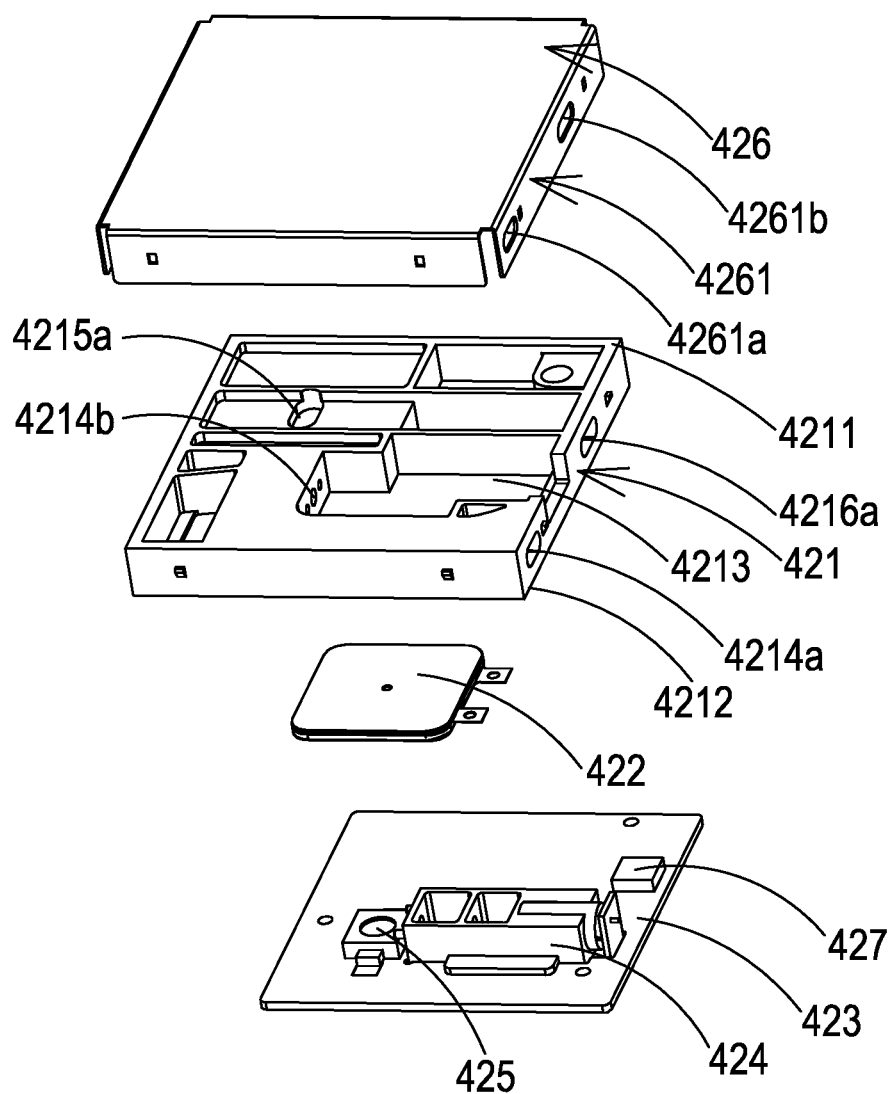
FIG. 4C illustrates an exploded view of the gas detection main body of the exemplary embodiment in the present disclosure.
Figure 5A:
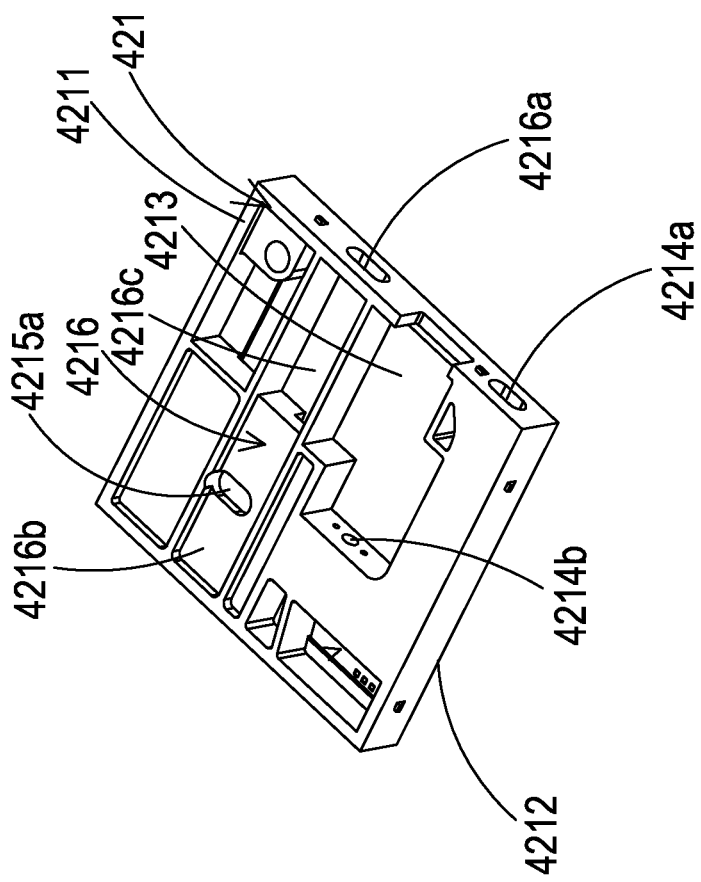
FIG. 5A illustrates a perspective view of a base of the exemplary embodiment in the present disclosure.
Figure 5B:
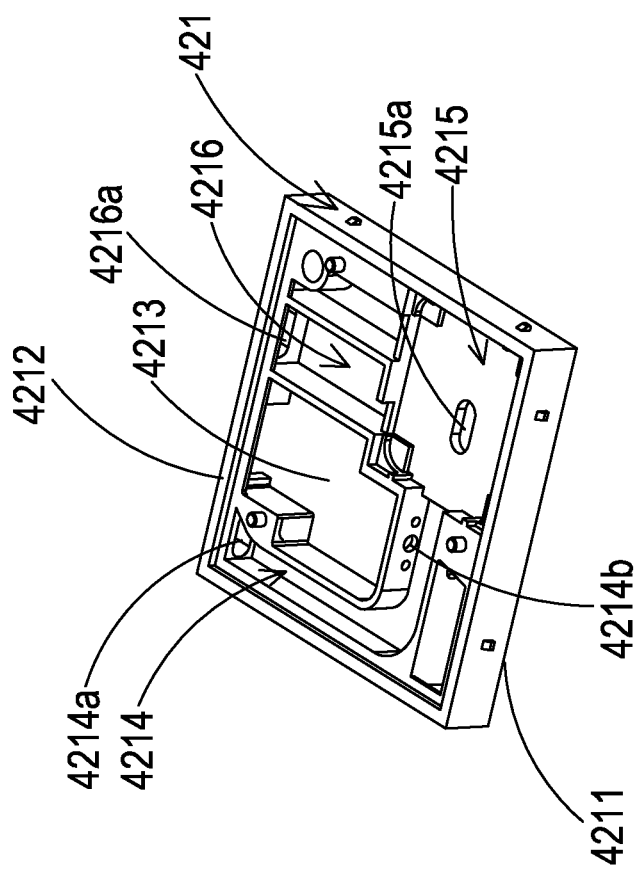
FIG. 5B illustrates another perspective view of the base of the exemplary embodiment in the present disclosure.
Figure 6:
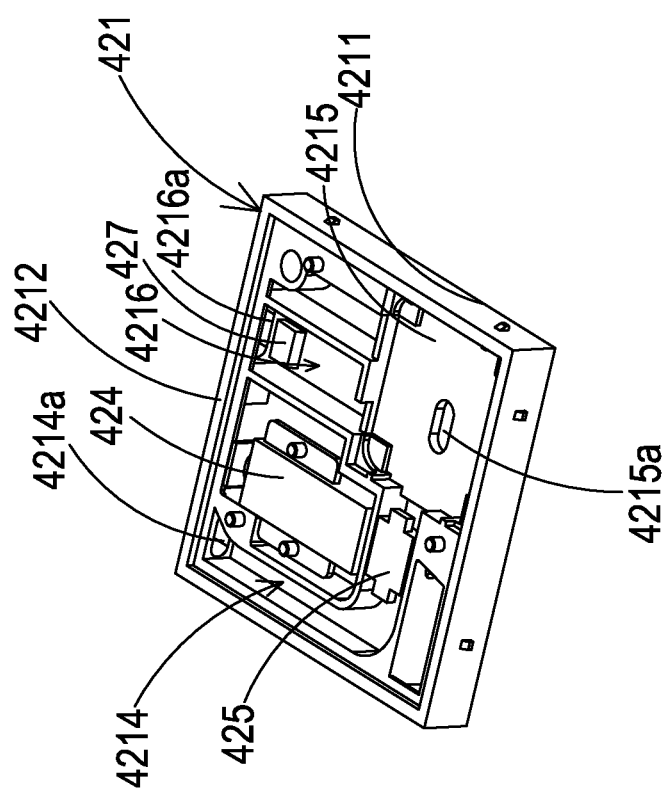
FIG. 6 illustrates a perspective view showing that the base is assembled with a laser component of the exemplary embodiment in the present disclosure.
Figure 7A:
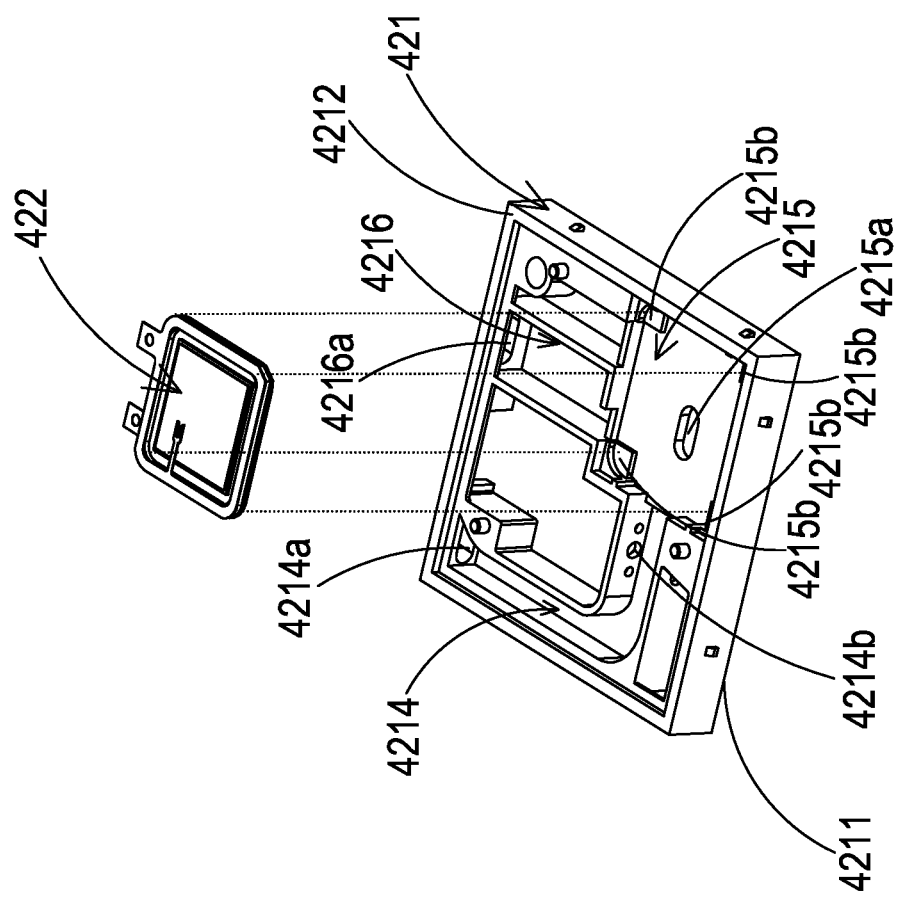
FIG. 7A illustrates an exploded view showing that a piezoelectric actuator is disposed in the base according to the exemplary embodiment in the present disclosure.
Figure 7B:
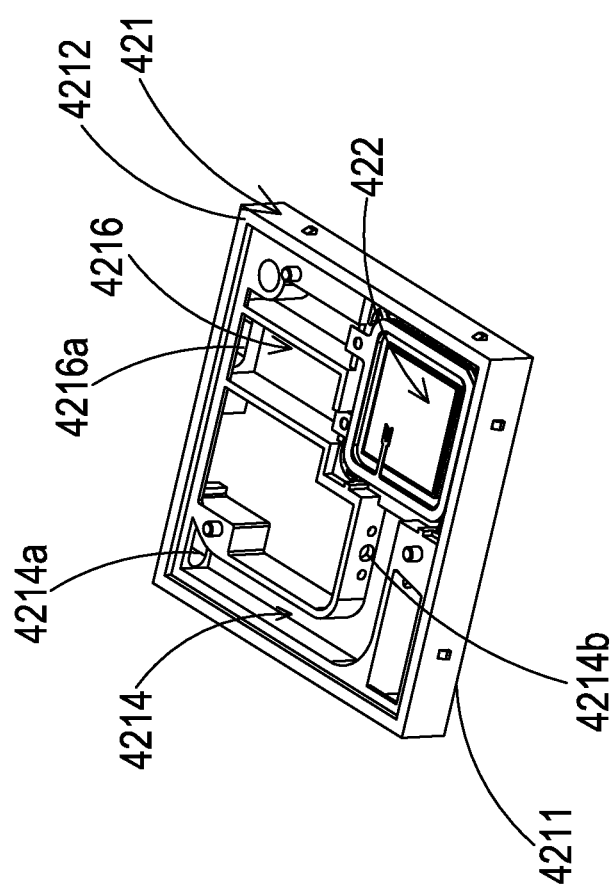
FIG. 7B illustrates a perspective view showing that the piezoelectric actuator is disposed in the base according to the exemplary embodiment in the present disclosure.
Figure 8A:
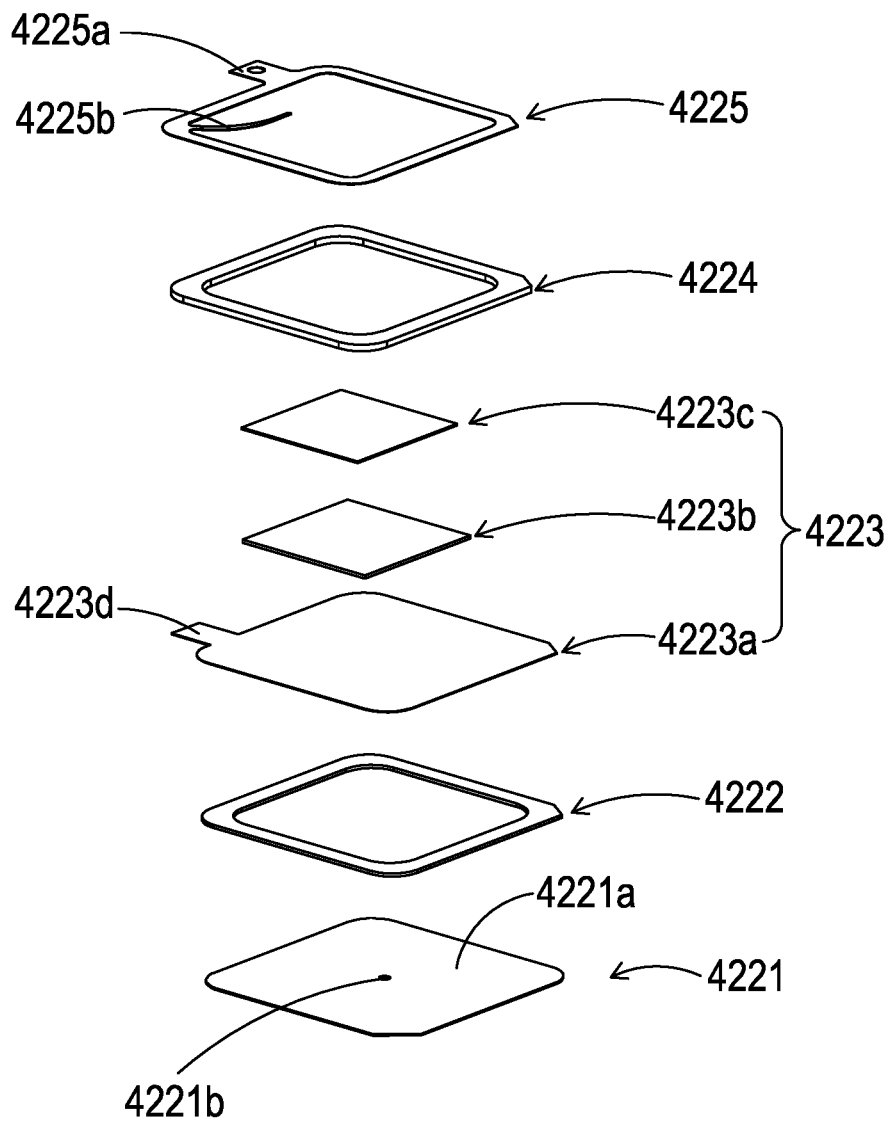
FIG. 8A illustrates an exploded view of the piezoelectric actuator of the exemplary embodiment in the present disclosure.
Figure 8B:
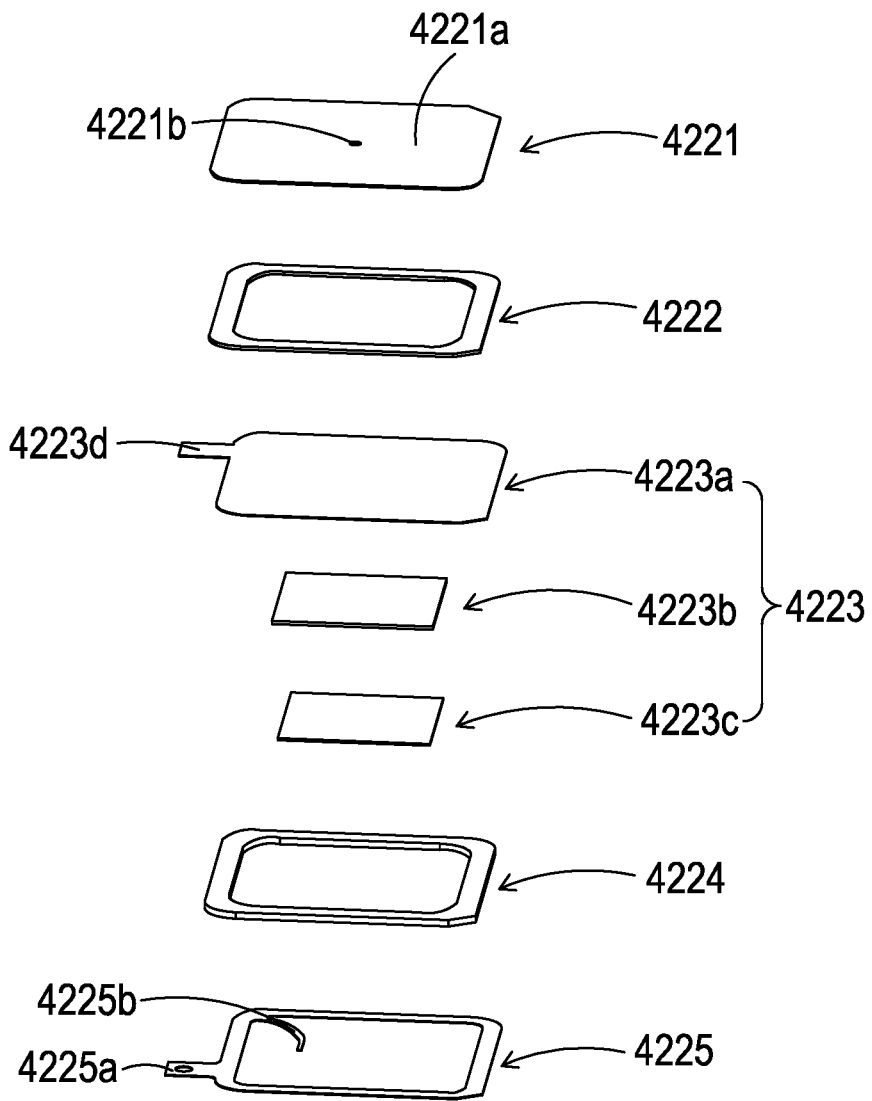
FIG. 8B illustrates another exploded view of the piezoelectric actuator of the exemplary embodiment in the present disclosure.

Please refer to FIG. 2C. The cleaning and filtration assembly D may be the combination of various embodiments. In one embodiment, the cleaning and filtration assembly D may be a combination of an activated carbon D1 and a high-efficiency particulate air (HEPA) filter D2, or a combination of the activated carbon D1, the high-efficiency particulate air filter D2, and a zeolite mesh D3. The activated carbon D1 is provided for filtering and absorbing PM2.5, the zeolite mesh D3 is provided for filtering and absorbing volatile organic compound (VOC), and the high-efficiency particulate air filter D2 is provided for absorbing the chemical smog, bacteria, dusts, particles, and pollens contained in the polluted gas, thereby the polluted gas introduced into the cleaning and filtration assembly D is filtered and purified. In some embodiments, a cleansing factor layer having chlorine dioxide is coated on the high-efficiency particulate air filter D2 for suppressing viruses, bacteria, fungus, influenza A virus, influenza B virus, Enterovirus, and Norovirus in the polluted gas introduced into the cleaning and filtration assembly D. Accordingly, the suppressing rate may exceed 99%, allowing the reduction of the cross infections of the viruses. In some other embodiments, a herbal protection coating layer including the extracts of *Rhus chinensis* Mill (may be *Rhus chinensis* Mill from Japan) and the extracts of *Ginkgo biloba* may be coated on the high-efficiency particulate air filter D2 to form a herbal protection anti-allergy filter which can efficiently perform anti-allergy function and destroy cell surface proteins of influenza viruses (e.g., influenza virus subtype H1N1) passing through the herbal protection anti-allergy filter. Alternatively, in some other embodiments, a layer of silver ions may be coated on the high-efficiency particulate air filter D2 for suppressing viruses, bacteria, and fungus in the polluted gas introduced by the cleaning and filtration assembly D.

In another embodiment, the cleaning and filtration assembly D may be a combination of the activated carbon D1, the high-efficiency particulate air filter D2, the zeolite mesh D1, and a photocatalyst unit D4. In the present embodiment, since the conversion from light energy into chemical energy is made by the photocatalyst unit D4, once the polluted gas in the indoor space is introduced into the cleaning and filtration assembly D, the hazardous matters in the polluted gas are degraded and sterilized to achieve the effect of filtration and purification by the cleaning and filtration assembly D.

In another embodiment, the cleaning and filtration assembly D may be a combination of the activated carbon D1, the high-efficiency particulate air filter D2, the zeolite mesh D3, and a photo plasma unit D5. The photo plasma unit D5 includes a nanometer light tube. The polluted gas introduced from the cleaning and filtration assembly D through the illumination of light irradiated from the nanometer light tube, the volatile organic gases contained in the polluted gas can be degraded and purified. When the polluted gas is introduced into the cleaning and filtration assembly D, the introduced polluted gas is illuminated by the light irradiated from the nanometer light tube, making the oxygen molecules and water molecules in the polluted gas degrade into high oxidative photo plasma for forming a plasma flow which is capable of destroying the organic molecules. Accordingly, volatile organic compounds (VOC) such as formaldehyde and toluene in the polluted gas can be degraded into water and carbon dioxide. Thus, the polluted gas can be filtered and purified by the cleaning and filtration assembly D.

In another embodiment, the cleaning and filtration assembly D may be a combination of the activated carbon D1, the high-efficiency particulate air filter D2, the zeolite mesh D3, and a negative ion unit D6. Through applying high voltage discharging to the polluted gas introduced into the cleaning and filtration assembly D, the particulates carry with positive charges in the polluted gas are adhered to the dust-collecting plate carry with negative charges. Accordingly, the polluted gas is filtered and purified by the cleaning and filtration assembly D.

In another embodiment, the cleaning and filtration assembly D may be a combination of the activated carbon D1, the high-efficiency particulate air filter D2, the zeolite mesh D3, and a plasma ion unit D7. The plasma ion unit D7 generates a high-voltage plasma. Therefore, the viruses and the bacteria in the polluted gas introduced into the cleaning and filtration assembly D are degraded by the high-voltage plasma. Moreover, through the high-voltage plasma, when the polluted gas is introduced into the cleaning and filtration assembly D, the oxygen molecules and the water molecules in the polluted gas are ionized to form cations ($H^+$) and anions ($O_2^-$). The substances attached with water molecules around the ions are attached on the surfaces of viruses and bacteria, converting the water molecules into oxidative oxygen ions (hydroxyl ions, $OH^-$ ions), and the oxidative oxygen ions take away the hydrogen ions of the proteins on the surfaces of the viruses and the bacteria to degrade the microorganisms as mentioned above. Accordingly, the polluted gas is filtered and purified by the cleaning and filtration assembly D.

In one embodiment, the cleaning and filtration assembly D may only include the high-efficiency particulate air filter D2. Alternatively, in another embodiment, the cleaning and filtration assembly D may be a combination of the high-efficiency particulate air filter D2 and any one of the photocatalyst unit D4, the photo plasma unit D5, the negative ion unit D6, and the plasma ion unit D7. In one embodiment, the cleaning and filtration assembly D may be a combination of the high-efficiency particulate air filter D2 and any two of the photocatalyst unit D4, the photo plasma unit D5, the negative ion unit D6, and the plasma ion unit D7. In one embodiment, the cleaning and filtration assembly D may be a combination of the high-efficiency particulate air filter D2 and any three of the photocatalyst unit D4, the photo plasma unit D5, the negative ion unit D6, and the plasma ion unit D7. In one embodiment, the cleaning and filtration assembly D may be a combination of the high-efficiency particulate air filter D2 and all of the photocatalyst unit D4, the photo plasma unit D5, the negative ion unit D6, and the plasma ion unit D7.

The polluted gas may include at least one selected from the group consisting of particulate matters, carbon monoxide (CO), carbon dioxide ($CO_2$), ozone ($O_3$), sulfur dioxide ($SO_2$), nitrogen dioxide ($NO_2$), lead (Pb), total volatile organic compounds (TVOC), formaldehyde (HCHO), bacteria, fungi, and viruses.

After describing the operation of the indoor air pollution prevention system according to one or some embodiments, the operation of the gas transmission of the gas detection module 1 is described as below.

As shown in FIG. 3 to FIG. 9A, the gas detection module 4 includes a control circuit board 41, a gas detection main body 42, a microprocessor 43, and a communication device 44. Wherein the gas detection main body 42, the microprocessor 43, and the communication device 44 are integrally packaged with the control circuit board 41 and electrically connected to each other. The microprocessor 43 and the communication device 44 are disposed on the control circuit board 11. The microprocessor 43 controls the driving signal of the gas detection main body 42 to enable the gas detection main body 42, which communicate outwardly through the communication device 44, and converts the information into a gas detection data for storage. The communication device 44 receives the gas detection data outputted from the microprocessor 43 and transmits the gas detection data to a cloud processing device 5b or to an external device (which may be a mobile device 22a). Moreover, in some embodiments, the outwardly communication transmission of the communication device 44 may be implemented through a bidirectional wired transmission. For example, the wired transmission may be achieved by a USB port, a mini-USB port, and micro-USB port. The outwardly communication transmission of the communication devices 44 may also be implemented through a bidirectional wireless transmission. For example, the wireless transmission may be achieved by a Wi-Fi module, a Bluetooth module, a radiofrequency identification module, and a near field communication module.

Moreover, in one or some embodiments, the gas detection main body 42 includes a base 421, a piezoelectric actuator 422, a driving circuit board 423, a laser component 424, a particulate sensor 425, an outer cap 426, and a gas sensor 427. The base 421 has a first surface 4211, a second surface 4212, a laser configuration region 4213, a gas inlet groove 4214, a gas-guiding component loading region 4215, and a gas outlet groove 4216. Wherein the first surface 4211 and the second surface 4212 are opposite to each other. The laser configuration region 4213 is hollowed out from the first surface 4211 to the second surface 4212 for accommodating the laser component 424. The outer cap 426 covers the base 421 and has a side plate 4261. The side plate 4261 has a gas inlet opening 4261a and a gas outlet opening 4261b. The gas inlet groove 4214 is recessed from the second surface 4212 and located adjacent to the laser configuration region 4213. The gas inlet groove 4214 has a gas inlet through hole 4214a and two lateral walls. The gas inlet through hole 4214a penetrates inside and outside of the base 421 and corresponds to the gas inlet opening 4261a of the outer cap 426. Two light permissive windows 4214b penetrate the two lateral walls of the gas inlet groove 4214 and are in communication with the laser configuration region 4213. Therefore, the first surface 4211 of the base 421 is covered by the outer cap 426, and the second surface 4212 of the base 421 is covered by the driving circuit board 423, therefore, a gas inlet path with the gas inlet groove 4214 can be defined as resulting from the aforementioned structure.

The gas-guiding component loading region 4215 is recessed from the second surface 4212 and in communication with the gas inlet groove 4214. A gas flowing hole 4215a penetrates a bottom surface of the gas-guiding component loading region 4215. Each of four corners of the gas-guiding component loading region 4215 has a positioning bump 4215b. The gas outlet groove 4216 has a gas outlet through hole 4216a, and the gas outlet through hole 4216a is corresponding to the gas outlet opening 4261b of the outer cap 426. The gas outlet groove 4216 includes a first region 4216b and a second region 4216c. The first region 4216b is recessed from a portion of the first surface 4211 corresponding to a vertical projection region of the gas-guiding component loading region 4215. The second region 4216c is at a portion extending from a portion not corresponding to the vertical projection region of the gas-guiding component loading region 4215, and the second region 4216c is hollowed out from the first surface 4211 to the second surface 4212 in a region where the first surface 4211 is not aligned with the gas-guiding component loading region 4215. The first region 4216b is connected to the second region 4216c to form a stepped structure. Moreover, the first region 4216b of the gas outlet groove 4216 is in communication with the gas flowing hole 4215a of the gas-guiding component loading region 4215, and the second region 4216c of the gas outlet groove 4216 is in communication with the gas outlet through hole 4216a. Therefore, when the first surface 4211 of the base 421 is covered by the outer cap 426 and the second surface 4212 of the base 421 is covered by the driving circuit board 423, the gas outlet groove 4216 and the driving circuit board 423 together define a gas outlet path.

Furthermore, the laser component 424 and the particulate sensor 425 are disposed on the driving circuit board 423 and located in the base 421, wherein the laser component 424 and the particulate sensor 425 are electrically connected to the driving circuit board 423. One should notice that to clearly explain the positions of the laser component 424, the particulate sensor 425, and the base 421, the driving circuit board 423 is not illustrated. In the embodiment of the present disclosure, the laser component 424 is located at the laser configuration region 4213 of the base 421. The particulate sensor 425 is located at the gas inlet groove 4214 of the base 421 and aligned with the laser component 424. Moreover, the laser component 424 corresponds to the light permissive windows 4214b, allowing the light beam emitted by the laser component 424 to pass therethrough into the gas inlet groove 4214. The path of the light beam emitted by the laser component 424 passes through the light permissive windows 4214b and is orthogonal to the gas inlet groove 4214. The light beam emitted by the laser component 424 pass through into the gas inlet groove 4214 by the light permissive windows 4214b, and the particulate matters in the gas inlet groove 4214 is illuminated by the light beam. When the light beam encounters the particulate matters, the light beam will be scattered to generate light spots. Hence, the particulate sensor 425 receives and calculates the light spots generated by the scattering to obtain the detection data of the gas (particulates information). Furthermore, the gas sensor 427 is disposed on the driving circuit board 423, and is located at the gas outlet groove 4216 for detecting the polluted gas introduced into the gas outlet groove 4216, wherein the gas sensor 427 is electrically connected to the driving circuit board 423. In one embodiment of the present disclosure, the gas sensor 427 includes at least one selected from the group consisting of a volatile organic compound detector capable of detecting gas information of carbon dioxide ($CO_2$) or total volatile organic compounds (TVOC), a formaldehyde sensor capable of detecting gas information of formaldehyde (HCHO) gas, a bacterial sensor capable of detecting information of bacteria or fungi, and a virus sensor capable of detecting information of viruses and a temperature and humidity sensor capable of detecting the temperature and humidity of the gas.

Moreover, the piezoelectric actuator 422 is located at the gas-guiding component loading region 4215 with square-shaped of the base 421, wherein the gas-guiding component loading region 4215 is interconnected with the gas inlet groove 4214. When the piezoelectric actuator 422 operates, the gas in the gas inlet groove 4214 is driven into the piezoelectric actuator 422, thereby the gas would pass through the gas flowing hole 4215a of the gas-guiding component loading region 4215, and entering into the gas outlet groove 4216. Moreover, the driving circuit board 423 covers the second surface 4212 of the base 421. The laser component 424 and the particulate sensor 425 are disposed on the driving circuit board 423, also the laser component 424 and the particulate sensor 425 are electrically connected to the driving circuit board 423. As the outer cap 426 covers the base 421, the gas inlet opening 4216a is corresponding to the gas inlet through hole 4214a of the base 421, and the gas outlet opening 4216b is corresponding to the gas outlet through hole 4216a of the base 421.

Furthermore, the piezoelectric actuator 422 includes a nozzle plate 4221, a chamber frame 4222, an actuation body 4223, an insulation frame 4224, and a conductive frame 4225. The nozzle plate 4221 is made by a flexible material and has a suspension sheet 4221a and a hollow hole 4221b. The suspension sheet 4221a is a flexible sheet which can bend and vibrate. The shape and the size of the suspension sheet 4221a approximately correspond to those of the inner edge of the gas-guiding component loading region 4215. The hollow hole 4221b penetrates through the center portion of the suspension sheet 4221a for the gas flowing therethrough. In one preferred embodiment of the present disclosure, the shape of the suspension sheet 4221a can be selected from square, circle, ellipse, triangle, and polygon.

Furthermore, the chamber frame 4222 is stacked on the nozzle plate 4221, and the shape of the chamber frame 4222 is corresponding to the shape of the nozzle plate 4221. The actuation body 4223 is stacked on the chamber frame 4222. A resonance chamber 4226 is defined through the stack structure of the actuation body 4223, the nozzle plate 4221, and the suspension sheet 4221a. The insulation frame 4224 is stacked on the actuation body 4223. The appearance of the insulation frame 4224 is similar to the appearance of the nozzle plate 4221. The conductive frame 4225 is stacked on the insulation frame 4224. The appearance of the conductive frame 4225 is similar to the appearance of the insulation frame 4224. The conductive frame 4225 has a conductive frame pin 4225a and a conductive electrode 4225b. The conductive frame pin 4225a extends outwardly from the outer edge of the conductive frame 4225, and the conductive electrode 4225b extends inwardly from the inner edge of the conductive frame 4225.

Moreover, the actuation body 4223 further includes a piezoelectric carrier plate 4223a, an adjusting resonance plate 4223b, and a piezoelectric plate 4223c. Wherein the piezoelectric carrier plate 4223a is stacked on the chamber frame 4222; the adjusting resonance plate 4223b is stacked on the piezoelectric carrier plate 4223a. The piezoelectric plate 4223c is stacked on the adjusting resonance plate 4223b; the adjusting resonance plate 4223b and the piezoelectric plate 4223c are accommodated in the insulation frame 4224. The conductive electrode 4225b of the conductive frame 4225 is electrically connected to the piezoelectric plate 4223c. In one embodiment, the piezoelectric carrier plate 4223a and the adjusting resonance plate 4223b are both made of the same conductive material or different conductive materials. The piezoelectric carrier plate 4223a has a piezoelectric pin 4223d. The piezoelectric pin 4223d and the conductive frame pin 4225a are in electrical connection with a driving circuit (not shown) of the driving circuit board 423 to receive a driving signal (which may be a driving frequency and a driving voltage). The piezoelectric pin 4223d, the piezoelectric carrier plate 4223a, the adjusting resonance plate 4223b, the piezoelectric plate 4223c, the conductive electrode 4225b, the conductive frame 4225, and the conductive frame pin 4225a may together form an electrical circuit for transmitting the driving signal, and the insulation frame 4224 is provided for electrically isolating the conductive frame 4225 from the actuation body 4223 for avoiding short circuit, thereby the driving signal can be transmitted to the piezoelectric plate 4223c. When the piezoelectric plate 4223c receives the driving signal, the piezoelectric plate 4223c deforms owing to the piezoelectric effect, and thus the piezoelectric carrier plate 4223a and the adjusting resonance plate 4223b are driven to perform reciprocating vibration correspondingly.

Moreover, the adjusting resonance plate 4223b is disposed between the piezoelectric plate 4223c and the piezoelectric carrier plate 4223a as a cushion element so as to adjust the vibration frequency of the piezoelectric carrier plate 4223a. Generally, the thickness of the adjusting resonance plate 4223b is greater than the thickness of the piezoelectric carrier plate 4223a. The thickness of the adjusting resonance plate 4223b may be changed to adjust the vibration frequency of the actuation body 4223. The nozzle plate 4221, the chamber frame 4222, the actuation body 4223, the insulation frame 4224, and the conductive frame 4225 are sequentially stacked and assembled, making the piezoelectric actuator 422 be placed and positioned in the gas-guiding component loading region 4215, thus a clearance 4221c is defined between the suspension sheet 4221a and the inner edge of the gas-guiding component loading region 4215 for the gas to pass therethrough.

Figure 10A:
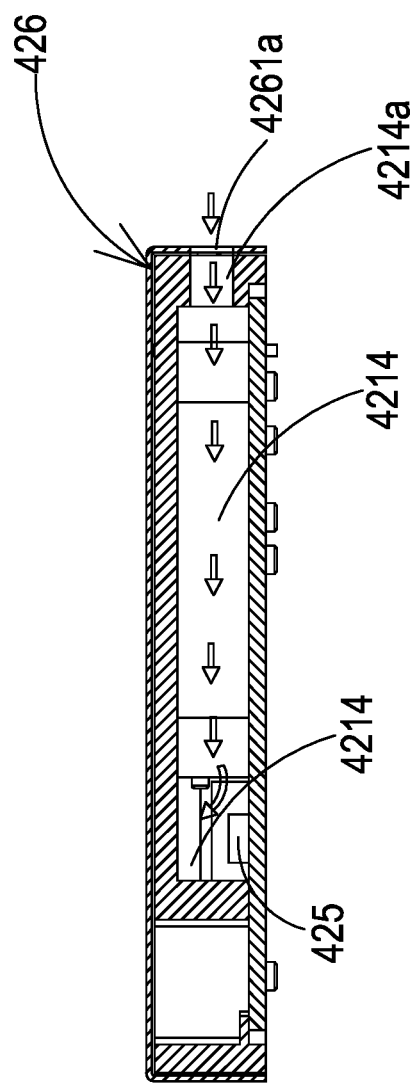
FIG. 10A illustrates a schematic cross-sectional view showing that the gas enters into the gas detection main body by the gas inlet through hole of the outer cap.
Figure 10B:
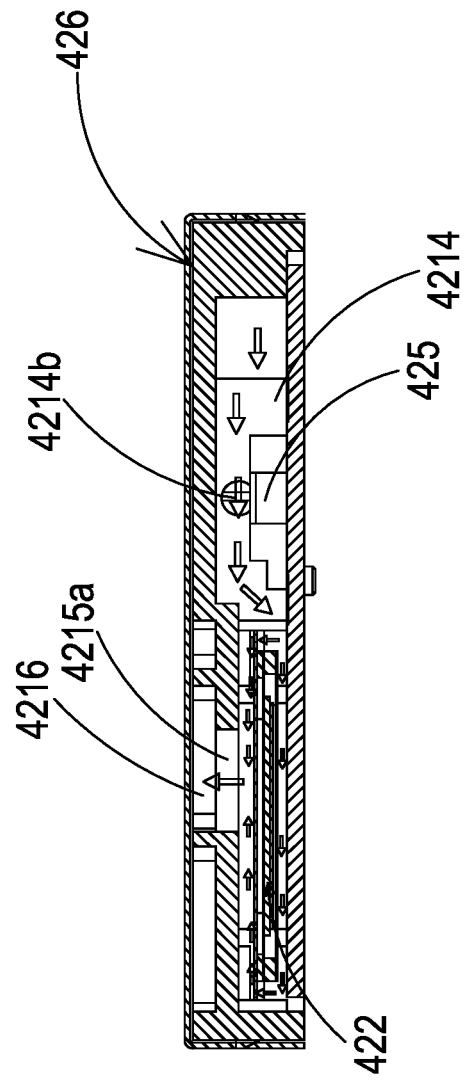
FIG. 10B illustrates a schematic cross-sectional view showing that the laser component emits the light beam into the gas inlet groove through the light permissive windows.
Figure 10C:
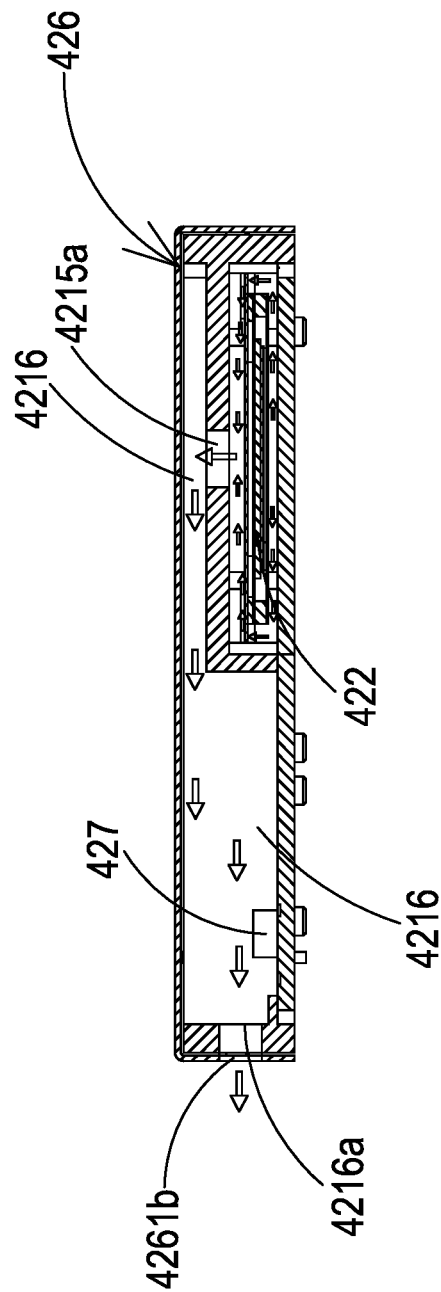
FIG. 10C illustrates a schematic cross-sectional view showing that the gas is discharged outwardly in the gas outlet groove, wherein the gas is pushed for passing through the gas outlet through hole and the gas outlet opening.

Please refer to the FIG. 10A, FIG. 10B, and FIG. 10C, a gas flow chamber 4227 is formed between a bottom of the nozzle plate 4221 and the bottom surface of the gas-guiding component loading region 4215. The gas flow chamber 4227 connect with the resonance chamber 4226 formed between the actuation body 4223, the nozzle plate 4221, and the suspension sheet 4221a through the hollow hole 4221b of the nozzle plate 4221. In one aspect of the present invention, the resonance chamber 4226 and the suspension sheet 4221a can generate the Helmholtz resonance effect to improve the transmission efficiency of the gas through the vibration frequencies of the gas in the resonance chamber 4226 and the suspension sheet 4221a are approaching the same. When the piezoelectric plate 4223c moves in a direction away from the bottom surface of the gas-guiding component loading region 4215, the piezoelectric plate 4223c drives the suspension sheet 4221a of the nozzle plate 4221 to move in the direction away from the bottom surface of the gas-guiding component loading region 4215 correspondingly. Hence, the volume of the gas flow chamber 4227 expands dramatically, therefore the internal pressure of the gas flow chamber 4227 decreases and creates a negative pressure, drawing the gas outside the piezoelectric actuator 422 to flow into the piezoelectric actuator 422 through the clearance 4221c and enter into the resonance chamber 4226 through the hollow hole 4221b, thereby increasing the gas pressure of the resonance chamber 4226 and thus generating a pressure gradient. When the piezoelectric plate 4223c drives the suspension sheet 4221a of the nozzle plate 4221 to move toward the bottom surface of the gas-guiding component loading region 4215, the gas inside the resonance chamber 4226 is pushed to flow out quickly through the hollow hole 4221b to further push the gas inside the gas flow chamber 4227, thereby the converged gas can be quickly and massively ejected out of the gas flow chamber 4227 and introduced into the gas flowing hole 4215a of the gas-guiding loading region 4215 in a state closing to an ideal gas state under the Benulli's law.

Figure 9A:
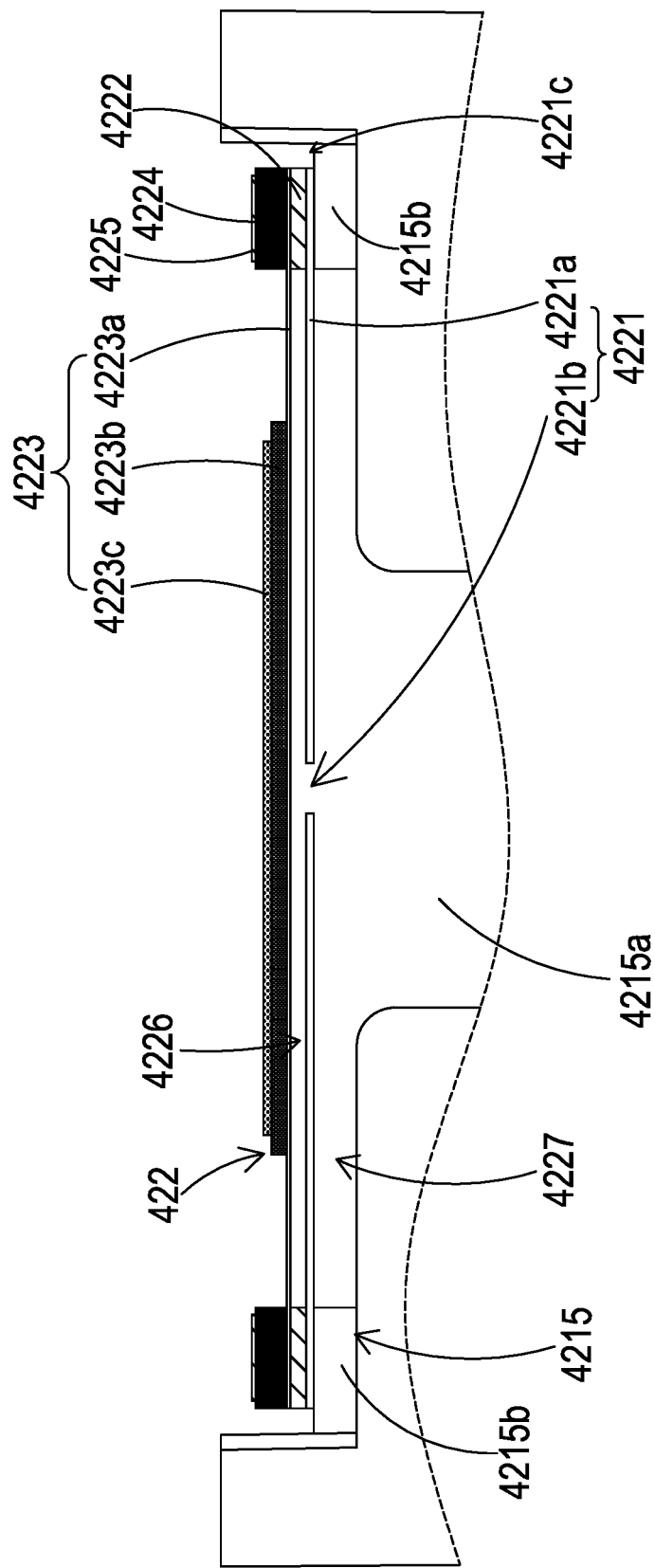
FIG. 9A illustrates a cross-sectional view of the piezoelectric actuator of the exemplary embodiment in the present disclosure before the operation.
Figure 9B:
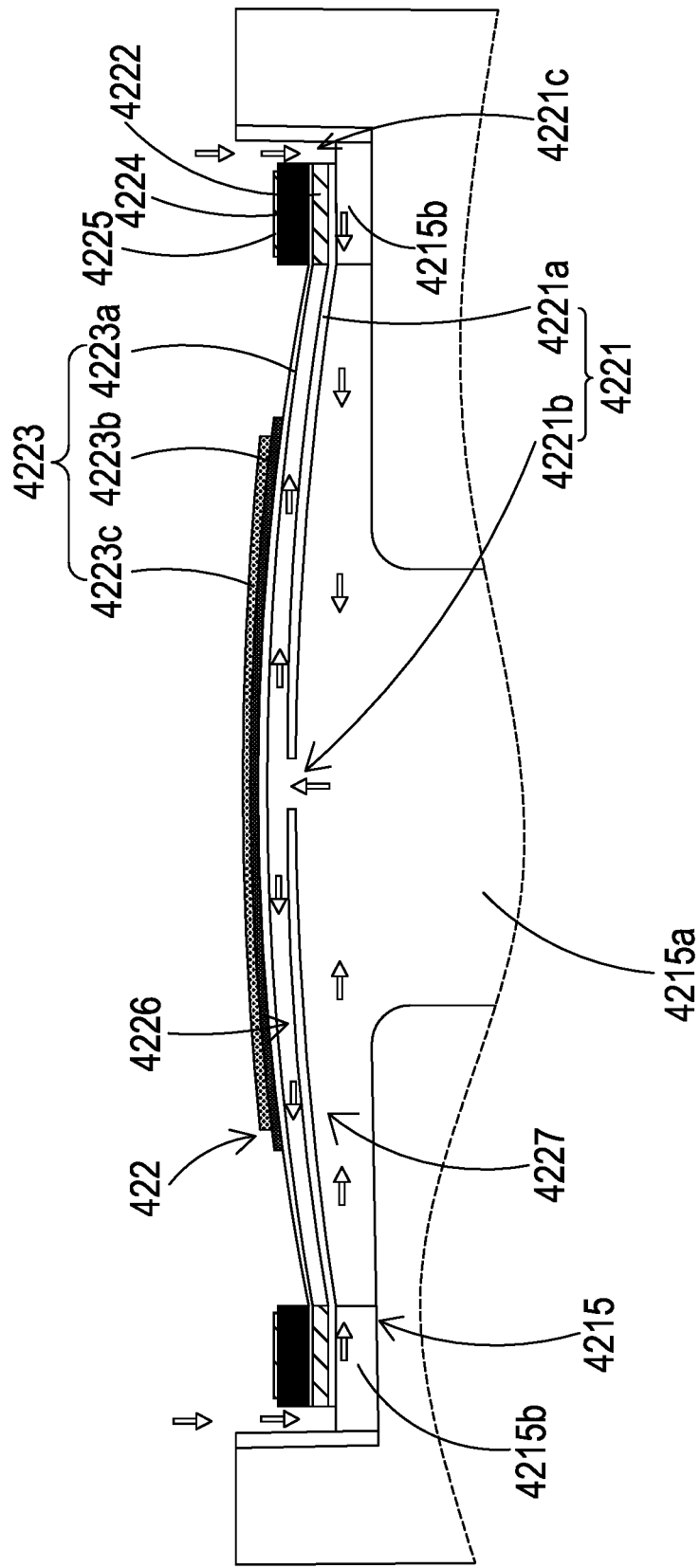
FIG. 9B illustrates a cross-sectional view showing the operation (1) of the piezoelectric actuator of the exemplary embodiment in the present disclosure.
Figure 9C:
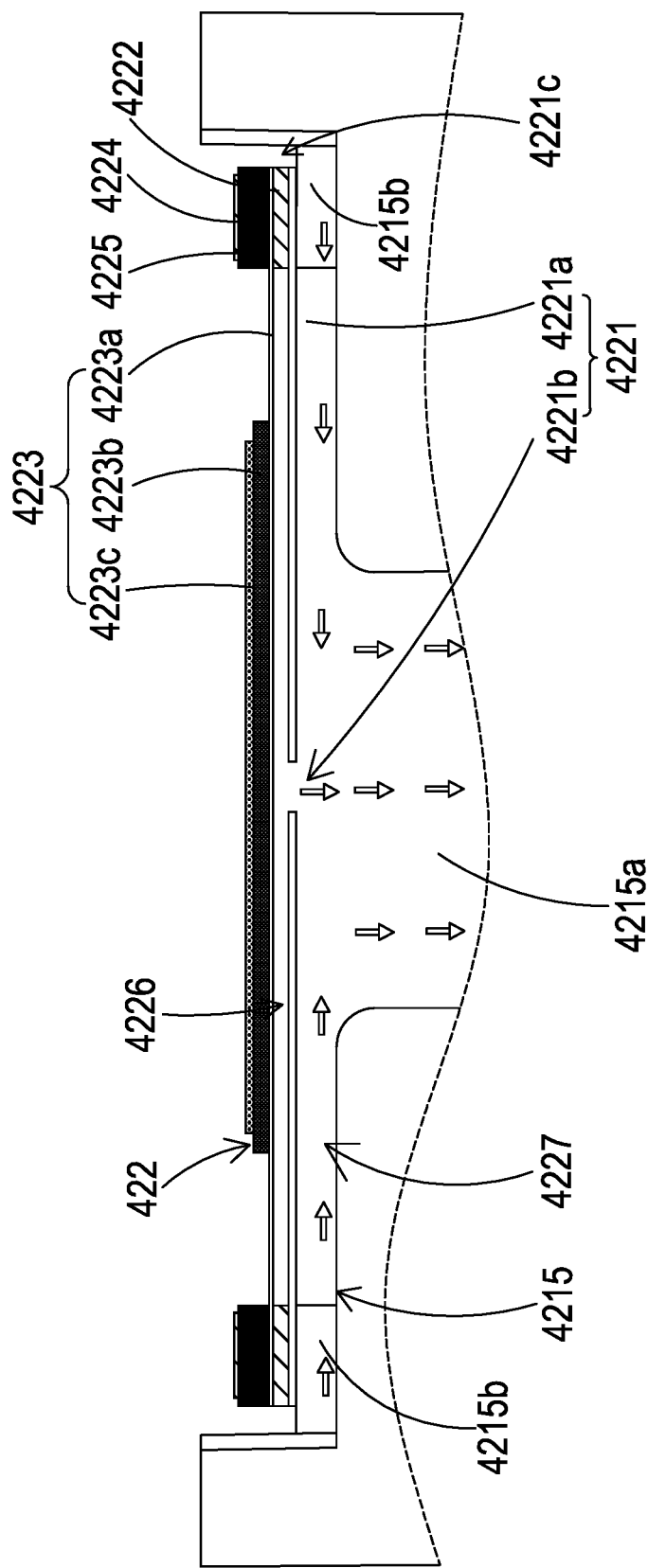
FIG. 9C illustrates a cross-sectional view showing the operation (2) of the piezoelectric actuator of the exemplary embodiment in the present disclosure.

Therefore, through repeating the steps as shown in FIG. 9B and FIG. 9C, the piezoelectric plate 4223c can bend and vibrate reciprocatingly. Further, after the gas is discharged out of the resonance chamber 4226, the internal pressure of the resonance chamber 4226 is lower than the equilibrium pressure due to the inertia, as a result, the pressure difference guides the gas outside the resonance chamber 4226 into the resonance chamber 4226 again. Thus, the resonance chamber 4226 and the piezoelectric plate 4223c can generate the Helmholtz resonance effect to achieve effective, high-speed and large-volume gas transmission of the gas when the vibration frequencies of the gas in the resonance chamber 4226 and piezoelectric plate 4223c are approaching the same.

Moreover, as shown in FIG. 10A to FIG. 10C, the gas enters into the gas inlet opening 4214a from the outer cap 426, which flow into the gas inlet groove 4214 of the base 421 through the gas inlet opening 4214a for reaching the position of the particulate sensor 425. Furthermore, the piezoelectric actuator 122 continuously drives the gas into the gas inlet path to facilitate the gas inside the detection main body 42 stably and quickly pass through the particulate sensor 425. Next, the light beam emitted by the laser component 424 passes through the light permissive windows 4214b and enters into the gas inlet groove 4214. The gas in the gas inlet groove 4214 which passes through the particulate sensor 425 is illuminated by the light beam. When the light beam encounters the particulate matters in the gas, the light beam will be scattered to generate light spots. The particulate sensor 425 receives and calculates the light spots generated by the scattering to obtain the information such as the particle size and the number of the particulate matters in the gas. Moreover, the gas passing through the particulate sensor 425 is continuously introduced into the gas flowing hole 4215a of the gas-guiding component loading region 4215 by the driving of the piezoelectric actuator 422 and enters into the gas outlet groove 4216. Finally, after the gas enters into the gas outlet groove 4216, since the piezoelectric actuator 422 continuously delivers the gas into gas outlet groove 4216, therefore the gas is pushed continuously, which discharged out of the gas detection main body 42 eventually through the gas outlet through hole 4216a and the gas outlet opening 4261b.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An indoor air pollution prevention system, adapted to perform gas exchange and filtration for an air pollution source in an indoor space, wherein the indoor air pollution prevention system comprises:
   at least one gas-exchange processing device adapted to control an outdoor gas in an outdoor space to be introduced into the indoor space or not, so as to filter and perform gas exchange to the air pollution source in the indoor space;
   at least one intake passage connected to the at least one gas-exchange processing device, wherein the at least one intake passage comprises an intake opening for guiding the outdoor gas in the outdoor space into the indoor space;
   at least one discharge passage connected to the at least one gas-exchange processing device, wherein the at least one discharge passage comprises a discharge opening for extracting and discharging the air pollution source in the indoor space to the outdoor space;
   at least one cleaning and filtration assembly disposed in the intake passage and the discharge passage for filtering the outdoor gas in the outdoor space guided from the intake opening and the air pollution source in the outdoor space guided from the discharge opening;
   at least two gas detection modules disposed at two sides of the at least one cleaning and filtration assembly for detecting the air pollution source and transmitting a gas detection data; and
   at least one intelligent control-driving processing device adapted to receive and compare the gas detection data outputted by the gas detection modules and transmit a driving command outwardly intelligently and selectively;
   wherein after the at least one intelligent control-driving processing device receives and compares the gas detection data, the at least one intelligent control-driving processing device intelligently and selectively controls the at least one gas-exchange processing device to introduce the outdoor gas into the intake passage or not, and the outdoor gas is further filtered by the at least one cleaning and filtration assembly and introduced into the indoor space; the at least one intelligent control-driving processing device controls the at least one gas-exchange processing device to be enabled in real-time under a surveillance condition of the gas detection module, therefore the air pollution source in the indoor space passes through the at least one cleaning and filtration assembly in the discharge passage and is discharged to the outdoor space, allowing the air pollution source in the indoor space to be filtered and exchanged to become a clean air.

2. The indoor air pollution prevention system according to claim 1, wherein the air pollution source comprises at least one selected from the group consisting of particulate matters, carbon monoxide, carbon dioxide, ozone, sulfur dioxide, nitrogen dioxide, lead, total volatile organic compounds, formaldehyde, bacteria, fungi, and viruses; wherein the surveillance condition is defined as the gas detection data of the air pollution source in the indoor space detected by the gas detection modules exceeds a safety detection value.

3. The indoor air pollution prevention system according to claim 2, wherein the safety detection value includes at least one selected from the group consisting of a concentration of PM2.5 which is less than 35 $\mu g/m^3$, a concentration of carbon dioxide which is less than 1000 ppm, a concentration of total volatile organic compounds which is less than 0.56 ppm, a concentration of formaldehyde which is less than 0.08 ppm, a colony-forming unit per cubic meter of bacteria which is less than 1500 $CFU/m^3$, a colony-forming unit per cubic meter of fungi which is less than 1000 $CFU/m^3$, a concentration of sulfur dioxide which is less than 0.075 ppm, a concentration of nitrogen dioxide which is less than 0.1 ppm, a concentration of carbon monoxide which is less than 9 ppm, a concentration of ozone which is less than 0.06 ppm, and a concentration of lead which is less than 0.15 $\mu g/m^3$.

4. The indoor air pollution prevention system according to claim 1, wherein each of the gas detection modules comprises a control circuit board, a gas detection main body, a microprocessor, and a communication device; the gas detection main body, the microprocessor, and the communication device are integrally packaged and electrically connected to the control circuit board; the microprocessor controls the detection of the gas detection main body, the gas detection main body detects the air pollution source to output a detection signal, and the microprocessor receives the detection signal to perform computation to generate and output the gas detection data to the communication device for transmitting outwardly.

5. The indoor air pollution prevention system according to claim 1, wherein the at least one intelligent control-driving processing device receives the gas detection data and transmits the driving command through a wireless communication; the at least one intelligent control-driving processing device comprises a receiving driver and a cloud processing device; the receiving driver receives the gas detection data outputted by the gas detection modules and uploads the gas detection data to the cloud processing device, the cloud processing device performs intelligent computation and comparison to generate a comparison result, and the cloud processing device intelligently and selectively transmits the driving command to the receiving driver according to the comparison result, so that the at least one intelligent control-driving processing device enables the operation of the at least one gas-exchange processing device and the at least one indoor cleaning and filtration device through the receiving driver.

6. The indoor air pollution prevention system according to claim 1, wherein the gas detection modules comprise at least one outdoor gas detection module and at least one indoor gas detection module; the at least one outdoor gas detection module is disposed in an outdoor space for detecting the outdoor gas in the outdoor space and transmitting an outdoor gas detection data to the at least one intelligent control-driving processing device; the at least one indoor gas detection module is disposed in the indoor space for detecting the air pollution source in the indoor space and transmitting an indoor gas detection data to the at least one intelligent control-driving processing device; a flow-guiding component is disposed at the intake opening of the intake passage and a flow-guiding component is disposed at the discharge opening of the discharge passage; the flow-guiding components are enabled under the surveillance condition of the indoor gas detection module, therefore the flow-guiding component at the intake opening introduces the outdoor gas in the outdoor space into the indoor space, and the flow-guiding component at the discharge opening extracts and discharges the air pollution source in the indoor space to the outdoor space.

7. The indoor air pollution prevention system according to claim 6, wherein the number of the at least one indoor gas detection module is plural; the at least one intelligent control-driving processing device receives and compares the indoor gas detection data detected by at least three of the indoor gas detection modules to perform intelligent computation to figure out a location of the indoor space containing the air pollution source, and the at least one intelligent control-driving processing device intelligently and selectively enables the operation of the flow-guiding component at the discharge opening nearby the air pollution source, accelerating to extract the air pollution source by the discharge opening without spreading.

8. The indoor air pollution prevention system according to claim 6, wherein the number of the at least one indoor gas detection module is plural; the at least one intelligent control-driving processing device receives and compares the indoor gas detection data detected by at least three of the indoor gas detection modules to perform intelligent computation to figure out a location of the indoor space containing the air pollution source, the at least one intelligent control-driving processing device intelligently and selectively enables the operation of the flow-guiding component at the discharge opening nearby the air pollution source in a first priority, and the at least one intelligent control-driving processing device performs intelligent computation to intelligently and selectively enable the operation of the flow-guiding component at the intake opening, forming a flow for guiding the air pollution source in the indoor space toward the flow-guiding component at the discharge opening for being extracted and filtered quickly.

9. The indoor air pollution prevention system according to claim 6, wherein the at least one indoor gas detection module is assembled on a wearable device and is capable of being worn on a human to detect the air pollution source in the indoor space in real-time and transmit the indoor gas detection data to the at least one intelligent control-driving processing device.

10. The indoor air pollution prevention system according to claim 6, wherein the at least one gas-exchange processing device comprises an intake channel, a discharge channel, and a circulation channel; the intake channel has at least one intake entrance and at least one intake exit, and the discharge channel has at least one discharge entrance and at least one discharge exit; the at least one intake exit is in connection with the intake passage, and the at least one discharge entrance is in connection with the discharge passage; the at least one outdoor gas detection module is disposed at the at least one intake entrance of the intake channel, and the at least one indoor gas detection module is disposed at the at least one intake exit of the intake channel; the at least one gas-exchange processing device comprises at least one of the flow-guiding components and the at least one cleaning and filtration assembly, and the flow-guiding component and the at least one cleaning and filtration assembly are disposed in the intake channel; the at least one indoor gas detection module enables the operation of the flow-guiding component of the at least one gas-exchange processing device, and the at least one intelligent control-driving processing device receives and compares the outdoor gas detection data and the indoor gas detection data to perform an intelligent selection to transmit the driving command to the at least one indoor gas detection module to enable the operation of the at least one gas-exchange processing device, therefore the flow-guiding component guides the outdoor gas in the outdoor space to pass through the at least one cleaning and filtration assembly to filter and purify the outdoor gas and introduce the outdoor gas into the indoor space through the intake passage, and the air pollution source in the indoor space is extracted from the discharge entrance of the at least one gas-exchange device through the discharge passage, and the air pollution source is further discharged from the discharge exit through the discharge channel, thereby allowing the air pollution source in the indoor space to be exchanged to form the clean air.

11. The indoor air pollution prevention system according to claim 10, wherein the flow-guiding component of the at least one gas-exchange processing device comprises an intake flow-guiding component and a discharge flow-guiding component; the at least one cleaning and filtration assembly and the intake flow-guiding component are disposed in the intake channel, and the intake flow-guiding component guides the outdoor gas in the outdoor space introduced into the at least one cleaning and filtration assembly through the intake channel, therefore the outdoor gas is further introduced into the indoor space through the intake passage; the discharge flow-guiding component is disposed in the discharge channel to extract the air pollution source of the indoor space in the discharge passage and discharge the air pollution source to the outdoor space through the discharge channel; the circulation channel is in connection between the intake channel and the discharge channel, thus the air pollution source of the indoor space in the discharge passage is introduced into the circulation channel, passing through the intake channel, and guided by the intake flow-guiding component to pass through the at least one cleaning and filtration assembly to be introduced into the indoor space again through the intake passage, achieving a circulating filtration for the air pollution source in the indoor space.

12. The indoor air pollution prevention system according to claim 10, wherein an intake valve is disposed at the at least one intake entrance of the intake channel, and a discharge valve is disposed at the at least one discharge exit of the discharge channel; when the at least one intelligent control-driving processing device receives and compares the indoor gas detection data and the outdoor gas detection data, identifying that the indoor gas detection data is higher than the outdoor gas detection data, the at least one intelligent control-driving processing device transmits the driving command to the at least one indoor gas detection module to enable the operations of the intake flow-guiding component and the discharge flow-guiding component of the at least one gas-exchange processing device to control the intake valve and the discharge valve to be opened, therefore the outdoor gas in the outdoor space is guided by the intake flow-guiding component from the intake entrance to pass through the at least one cleaning and filtration assembly in the intake channel to be filtered and purified and introduced into the indoor space through the intake passage, also the air pollution source of the indoor space is extracted by the discharge flow-guiding component from the discharge passage and discharged to the outdoor space from the discharge exit through the discharge channel, allowing the indoor space to have the clean air.

13. The indoor air pollution prevention system according to claim 10, wherein an intake valve is disposed at the at least one intake entrance of the intake channel, and a discharge valve is disposed at the at least one discharge exit of the discharge channel; when the at least one intelligent control-driving processing device receives and compares the indoor gas detection data and the outdoor gas detection data and identifies that the indoor gas detection data is lower than the outdoor gas detection data, the at least one intelligent control-driving processing device transmits the driving command to the at least one indoor gas detection module to enable the operations of the intake flow-guiding component and the discharge flow-guiding component of the at least one gas-exchange processing device to control the intake valve to be closed and the discharge valve to be opened, thus the air pollution source is extracted by the discharge flow-guiding component from the discharge passage and discharged to the outdoor space from the discharge exit through the discharge channel; the air pollution source passes through the circulation channel and the intake channel, filtered and purified by the at least one cleaning and filtration assembly, also the air pollution is introduced to the indoor space through the intake passage, allowing the indoor space to have the clean air.

14. The indoor air pollution prevention system according to claim 6, further comprising at least one indoor cleaning and filtration device, wherein the at least one indoor cleaning and filtration device further comprises the flow-guiding component and the cleaning and filtration assembly; the at least one indoor cleaning and filtration device receives the driving command transmitted by the at least one intelligent control-driving processing device to filter and perform gas exchange to the air pollution source in the indoor space.

15. The indoor air pollution prevention system according to claim 14, wherein the number of the at least one indoor gas detection module is plural; at least two of the indoor gas detection modules are disposed at two sides the cleaning and filtration assembly of the at least one indoor cleaning and filtration device, therefore the at least one intelligent control-driving processing device receives and compares the indoor gas detection data outputted by the indoor gas detection modules, allowing the at least one indoor cleaning and filtration device to filter the air pollution source to form the clean air.

16. The indoor air pollution prevention system according to claim 15, wherein the number of the at least one indoor cleaning and filtration device is plural; the at least one intelligent control-driving processing device receives and compares the indoor gas detection data detected by at least three of the indoor gas detection modules to perform intelligent computation to figure out the location of the indoor space containing the air pollution source, intelligently and selectively enables the operations of the flow-guiding component at the discharge opening and an indoor cleaning and filtration device nearby the air pollution source, accelerating to extract the air pollution source by the discharge opening and to filter and purify the air pollution source by the indoor cleaning and filtration device nearby the air pollution source without spreading.

17. The indoor air pollution prevention system according to claim 15, wherein the at least one intelligent control-driving processing device receives and compares the indoor gas detection data detected by at least three of the indoor gas detection modules to perform intelligent computation to figure out a location of the indoor space containing the air pollution source; wherein the at least one intelligent control-driving processing device intelligently and selectively enables the operations of the flow-guiding component at the discharge opening and an indoor cleaning and filtration device nearby the air pollution source in a first priority, and intelligently and selectively enables the operations of the flow-guiding component at the intake opening and rest of the indoor cleaning and filtration devices, forming the flow for guiding the air pollution source in the indoor space toward the flow-guiding component at the discharge opening for being extracted and toward the indoor cleaning and filtration device nearby the air pollution source for being filtered and purified quickly.

18. The indoor air pollution prevention system according to claim 14, wherein the at least one indoor cleaning and filtration device is an air conditioner; the at least one indoor gas detection module is assembled on the at least one indoor cleaning and filtration device to enable the operation of the at least one indoor cleaning and filtration device; the cleaning and filtration assembly is disposed in front of the flow-guiding component; the at least one intelligent control-driving processing device receives and compares the outdoor gas detection data and the indoor gas detection data to perform an intelligent selection to transmit the driving command to the at least one indoor gas detection module, enabling the operation of the at least one indoor cleaning and filtration device, therefore the flow-guiding component guides the air pollution source in the indoor space to pass through the cleaning and filtration assembly to be filtered, allowing the air pollution source in the indoor space to be filtered to form the clean air.

19. The indoor air pollution prevention system according to claim 14, wherein the at least one indoor cleaning and filtration device is a cooker hood; the at least one indoor gas detection module is assembled on the at least one indoor cleaning and filtration device to enable the operation of the at least one indoor cleaning and filtration device; the cleaning and filtration assembly is disposed behind the flow-guiding component; the at least one intelligent control-driving processing device receives and compares the outdoor gas detection data and the indoor gas detection data to perform an intelligent selection to transmit the driving command to the at least one indoor gas detection module, enabling the operation of the at least one indoor cleaning and filtration device, therefore the flow-guiding component guides the air pollution source in the indoor space to pass through the cleaning and filtration assembly to be filtered, allowing the air pollution source in the indoor space to be filtered to form the clean air.

20. The indoor air pollution prevention system according to claim 14, wherein the at least one indoor cleaning and filtration device is a ventilator; the at least one indoor gas detection module is assembled on the at least one indoor cleaning and filtration device to enable the operation of the at least one indoor cleaning and filtration device; the cleaning and filtration assembly is disposed behind the flow-guiding component; the at least one intelligent control-driving processing device receives and compares the outdoor gas detection data and the indoor gas detection data to perform an intelligent selection to transmit the driving command to the at least one indoor gas detection module, enabling the operation of the at least one indoor cleaning and filtration device, therefore the flow-guiding component guides the air pollution source in the indoor space to pass through the cleaning and filtration assembly to be filtered, allowing the air pollution source in the indoor space to be filtered to form the clean air.

21. The indoor air pollution prevention system according to claim 14, wherein the at least one indoor cleaning and filtration device is a cleaner; the at least one indoor gas detection module is assembled on the at least one indoor cleaning and filtration device to enable the operation of the at least one indoor cleaning and filtration device; the cleaning and filtration assembly is disposed behind the flow-guiding component; the at least one intelligent control-driving processing device receives and compares the outdoor gas detection data and the indoor gas detection data to perform an intelligent selection to transmit the driving command to the at least one indoor gas detection module, enabling the operation of the at least one indoor cleaning and filtration device, therefore the flow-guiding component guides the air pollution source in the indoor space to pass through the cleaning and filtration assembly to be filtered, allowing the air pollution source in the indoor space to be filtered to form the clean air.

22. The indoor air pollution prevention system according to claim 14, wherein the at least one indoor cleaning and filtration device is an electric fan; the at least one indoor gas detection module is assembled on the at least one indoor cleaning and filtration device to enable the operation of the at least one indoor cleaning and filtration device; the cleaning and filtration assembly is disposed behind the flow-guiding component; the at least one intelligent control-driving processing device receives and compares the outdoor gas detection data and the indoor gas detection data to perform an intelligent selection to transmit the driving command to the at least one indoor gas detection module, enabling the operation of the at least one indoor cleaning and filtration device, therefore the flow-guiding component guides the air pollution source in the indoor space to pass through the cleaning and filtration assembly to be filtered, allowing the air pollution source in the indoor space to be filtered to form the clean air.

23. The indoor air pollution prevention system according to claim 14, wherein the at least one indoor cleaning and filtration device is a vacuum cleaner; the at least one indoor gas detection module is assembled on the at least one indoor cleaning and filtration device to enable the operation of the at least one indoor cleaning and filtration device; the cleaning and filtration assembly is disposed behind the flow-guiding component; the at least one intelligent control-driving processing device receives and compares the outdoor gas detection data and the indoor gas detection data to perform an intelligent selection to transmit the driving command to the at least one indoor gas detection module, enabling the operation of the at least one indoor cleaning and filtration device, therefore the flow-guiding component guides the air pollution source in the indoor space to pass through the cleaning and filtration assembly to be filtered, allowing the air pollution source in the indoor space to be filtered to form the clean air.

24. The indoor air pollution prevention system according to claim 14, wherein the at least one indoor cleaning and filtration device is a blower fan; the at least one indoor gas detection module is assembled on the at least one indoor cleaning and filtration device to enable the operation of the at least one indoor cleaning and filtration device; the cleaning and filtration assembly is disposed behind the flow-guiding component; the at least one intelligent control-driving processing device receives and compares the outdoor gas detection data and the indoor gas detection data to perform an intelligent selection to transmit the driving command to the at least one indoor gas detection module, enabling the operation of the at least one indoor cleaning and filtration device, therefore the flow-guiding component guides the air pollution source in the indoor space to pass through the cleaning and filtration assembly to be filtered, allowing the air pollution source in the indoor space to be filtered to form the clean air.

\* \* \* \* \*